US008610956B2

(12) United States Patent
Takebe et al.

(10) Patent No.: US 8,610,956 B2
(45) Date of Patent: Dec. 17, 2013

(54) HALFTONE DOT FORMATION METHOD AND APPARATUS, AND IMAGE FORMING APPARATUS

(75) Inventors: Yoshifumi Takebe, Kanagawa (JP); Akira Ishii, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/106,204

(22) Filed: May 12, 2011

(65) Prior Publication Data
US 2011/0211230 A1 Sep. 1, 2011

Related U.S. Application Data

(62) Division of application No. 11/358,061, filed on Feb. 22, 2006, now Pat. No. 7,973,972.

(30) Foreign Application Priority Data

Feb. 22, 2005 (JP) ................ 2005-045107
Mar. 10, 2005 (JP) ................ 2005-066807
Feb. 9, 2006 (JP) ................ 2006-032016
Feb. 10, 2006 (JP) ................ 2006-033217

(51) Int. Cl.
*H04N 1/405* (2006.01)
(52) U.S. Cl.
USPC .......... 358/3.06; 347/131; 358/1.9; 358/3.01; 358/3.02; 358/3.11
(58) Field of Classification Search
USPC ............. 358/3.01, 1.9, 3.02, 3.06, 3.11, 3.12, 358/3.14, 3.3; 101/352.13; 347/12, 15, 131; 382/100, 167
See application file for complete search history.

(56) References Cited

U.S. PATENT DOCUMENTS

| 5,291,311 A | 3/1994 | Miller |
| 5,828,463 A | 10/1998 | Delabastita |
| 5,884,013 A | 3/1999 | Bosschaerts et al. |

(Continued)

FOREIGN PATENT DOCUMENTS

| JP | A 62-216748 | 9/1987 |
| JP | A 03-053951 | 3/1991 |

(Continued)

OTHER PUBLICATIONS

U.S. Appl. No. 11/357,950, filed Feb. 22, 2006.

(Continued)

*Primary Examiner* — King Poon
*Assistant Examiner* — David S Cammack
(74) *Attorney, Agent, or Firm* — Oliff & Berridge, PLC

(57) ABSTRACT

An image processing method generates a halftone image by forming a halftone dot represented by a set of one or plural output dots corresponding to an intensity of an input image signal while making a part of the dots constituting the halftone dot to be an actual non-output dot so as to reduce an amount of a coloring material of a halftone-dot portion. The image processing method includes holding in a predetermined storage medium halftone-dot profile data for forming the halftone dot corresponding to the intensity of the image signal and gap-size profile data representing a size of a set of the non-output dot; and generating the halftone dot comprising a gap having a size based on the gap-size profile data, a size of the halftone dot being based on the halftone-dot profile data.

16 Claims, 21 Drawing Sheets

(56) References Cited

U.S. PATENT DOCUMENTS

| | | | |
|---|---|---|---|
| 6,498,661 B1* | 12/2002 | Brossman et al. | 358/3.14 |
| 6,512,597 B1* | 1/2003 | Cooper et al. | 358/1.9 |
| 6,532,082 B1 | 3/2003 | Dewitte | |
| 6,791,714 B1* | 9/2004 | Ishimura | 358/1.9 |
| 6,970,270 B1* | 11/2005 | Ushiroda | 358/1.9 |
| 2002/0059460 A1* | 5/2002 | Ishida et al. | 709/246 |
| 2002/0083855 A1* | 7/2002 | Samworth | 101/352.13 |
| 2002/0186417 A1* | 12/2002 | Inoue | 358/3.14 |
| 2003/0218780 A1* | 11/2003 | Braun et al. | 358/3.12 |
| 2004/0013284 A1* | 1/2004 | Yu | 382/100 |
| 2004/0160644 A1 | 8/2004 | Samworth | |

FOREIGN PATENT DOCUMENTS

| | | |
|---|---|---|
| JP | A 10-013685 | 1/1998 |
| JP | A 2004-128718 | 4/2004 |
| JP | A 2005-026987 | 1/2005 |
| WO | WO 00/72580 A1 | 11/2000 |

OTHER PUBLICATIONS

Mar. 19, 2010 Office Action issued in Japanese patent application No. 2006-033217 (with translation).

Mar. 19, 2010 Office Action issued in Japanese patent application No. 2006-032016 (with translation).

* cited by examiner

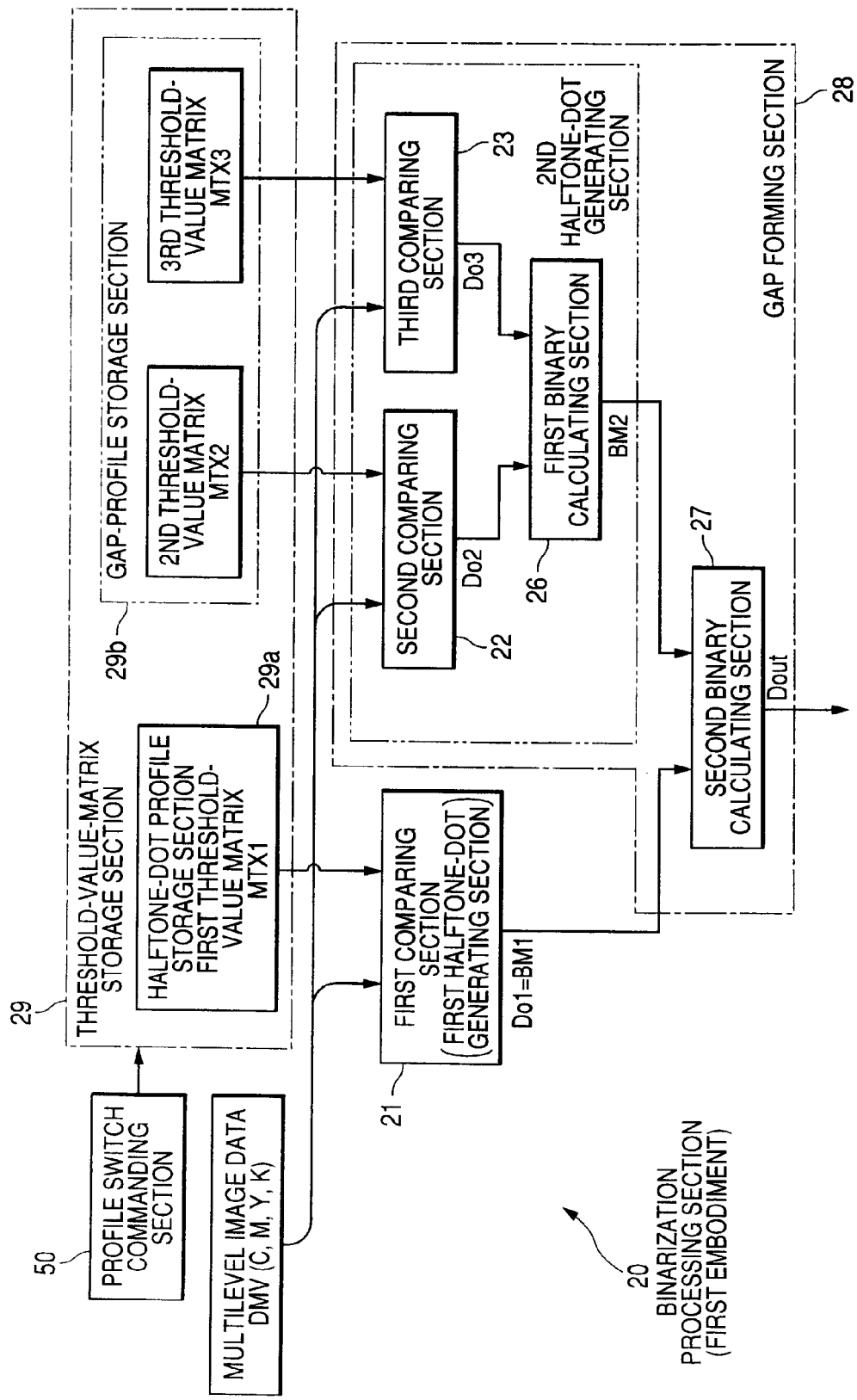

GAP-SIZE FIXED SYSTEM

GAP-SIZE VARIABLE SYSTEM

CONVENTIONAL SYSTEM

LOW ←――― DENSITY OF INPUT IMAGE ―――→ HIGH

GAP-SIZE FIXED SYSTEM

LOW ←――― DENSITY OF INPUT IMAGE ―――→ HIGH

GAP-SIZE VARIABLE SYSTEM

LOW ←――― DENSITY OF INPUT IMAGE ―――→ HIGH

PRINCIPLE OF SUPPLEMENT

SUPPLEMENT OUTPUT DOTS TO OUTSIDE OF HALFTONE DOT IN ACCORDANCE WITH NUMBER OF GAP DOTS FORMED INSIDE A CLUSTER OF OUTPUT DOTS FORMING THE HALFTONE DOT

EXAMPLE IN VICINITY OF MAXIMUM DENSITY

EXAMPLE IN RANGE FROM LOW DENSITY TO VICINITY OF MAXIMUM DENSITY

EXAMPLE AT APPROXIMATE MAXIMUM DENSITY

W/O DEVIATION   W/ DEVIATION

W/O DEVIATION   W/ DEVIATION

HALFTONE DOT FORMATION METHOD AND APPARATUS, AND IMAGE FORMING APPARATUS

This application is a divisional of U.S. patent application Ser. No. 11/358,061 filed on Feb. 22, 2006, which claims priority to Japanese Patent Application No. 2005-45107 filed on Feb. 22, 2005, Japanese Patent Application No. 2005-66807 filed on Mar. 10, 2005, Japanese Patent Application No. 2006-32016 filed on Feb. 9, 2006 and Japanese Patent Application No. 2006-33217 filed on Feb. 10, 2006. The entire disclosures of the prior applications are hereby incorporated herein by reference in their entirety.

BACKGROUND OF THE INVENTION

1. Field of the Invention

The present invention relates to an image processing method, an image processing apparatus, and an image forming apparatus. More specifically, the invention relates to a binarization processing technique for generating a halftone image by forming a halftone dot having a predetermined size corresponding to an intensity of an input image signal, the halftone dot which is used to record a gradation image on an image recording medium in a printing technique such as an electrophotographic method and an inkjet method.

2. Description of the Related Art

As one of the techniques for generating a gradation image using binary data, there has been known a method for generating a gradation image by using the pulse-surface-area modulation, that is, so called binarization processing method (particularly referred to as a halftone processing method)) in which colored dots called halftone dots (set of individual halftone output dots), each having a predetermined size corresponding to an intensity of an input image signal, are formed to thereby reproduce the density of a halftone image by the size of each colored dot.

For example, a color printed matter is obtained by printing respective inks, each having one of four colors composed of yellow (Y), magenta (M), cyan (C), and black (K) colors, on a recording medium (printing paper) with the inks superposed on one another subsequently, using four printing plates for the inks. On the printing plates are recorded halftone plate images in which gradation of continuous-tone images of a color manuscript is reproduced with a set of microscopic halftone dots.

For example, when generating a halftone plate image in a printing technique using an electrophotographic method, a comparator compares multilevel-image signals (multilevel data) representing the gradation of an image of a color document with predetermined screen pattern data (threshold data at a predetermined coordinate in a threshold-value matrix; hereinafter may be referred to as a threshold value), to generate binarized recording signals.

Further, the halftone plate images are exposed on an image formation member (for example, a photoconductor drum) by controlling on/off of a light beam for exposure according to halftone dot signals, using the binarized recording signals as on/off signals (halftone dot signals) for each record pixel. Then, toner (powder) is sprayed onto the image formation member to visualize an image on the image formation member (a latent image) as a toner image. Thereafter, the toner image is transferred and fused onto the image recording medium to form an image having halftone dots having a size corresponding to the density of the image.

Here, when the halftone dots are used in the electrophotographic method, in general, one or two grains (1.5 grains in average) of toner are piled up, reaching a height in a range of ten and several μm before a toner image is fused. Since the height of the piled-up toner is in many cases determined by an amount of toner required for the maximum density of the image, it may be an excessive amount of toner for halftone reproduction. In particular, since the size of a halftone dot is small in highlight tone area (low density region), there are high possibilities that this problem occurs.

For color reproduction, a thin halftone-dot toner image is needed in the transfer process of toner because deterioration of image quality during the transfer process increases as the thickness of a halftone-dot toner image is larger. In addition, for a multi-transfer for the color reproduction, more attention should be paid to the deterioration of image quality. However, it is difficult that the amount of toner needed for the maximum density is compatible with the amount of toner appropriate for the halftone dot reproduction.

Further, an unfused toner image having a thickness in the range of ten and several μm is crushed into a fused toner image having a thickness of several μm after it is fused. When the toner fused on paper absorbs light, density reproduction by the toner occurs. In order to enhance the light absorption efficiency, it is required to efficiently expose a coloring material containing a thin toner layer to light. However, as described above, in the halftone-dot structure for the halftone reproduction, the toner layer may become excessively thick in many cases, and therefore, the toner which makes a low contribution to light absorption exists on the paper.

On the other hand, in a field of a printing technique, such as an inkjet method, using ink as a coloring material, patent documents 1 to 5 disclose a technique of controlling the amount of ink adhesion for forming halftone dots for the purpose of adjusting the thickness of the halftone dots called a dot gain or transferability of ink (coloring material).

[Patent Document 1] WO 00/72580
[Patent Document 2] U.S. Pat. No. 6,532,082
[Patent Document 3] JP Sho. 62-216748 A
[Patent Document 4] JP Hei. 3-053951 A
[Patent Document 5] JP Hei. 10-13685 A For example, for the purpose of reducing the dot gain of a stochastic screen (stochastic printing), mechanism disclosed in the patent document 1 is a technique for appropriately reducing the density of a binarized image by further stochastically thinning out an image binarized with the stochastic screen.

In addition, mechanism disclosed in the patent document 2 is a technique for appropriately reducing the density of a binarized image by stochastically thinning out the image binarized by a normal halftone process, premised on halftone dots of clustered dots.

More specifically, in the mechanism disclosed in the patent document 1, with respect to the stochastic screen called an FM screen; and in the mechanism disclosed in the patent document 2, with respect to a regular halftone screen called an AM screen, the dot gain and the amount of ink are adjusted by non-periodically thinning out some of the halftone dots. That is, halftone dots and gap dots area synchronously generated.

In particular, in the mechanism disclosed in the patent document 2, a normal halftone-dot image and an image representing a gap dot for asynchronously thinning out halftone dots are prepared, and the two images are combined to thereby generate a halftone-dot image having gap dots.

However, in the techniques disclosed in the patent documents 1 to 5, it is necessary to redesign parameters for the binarization process whenever the gap size or the frequency of gap generation changes, and it is difficult to cope with the change.

Further, when some of the halftone dots are thinned out, the density of an output image becomes lower than the density to be originally output, that is, an error occurs in the density of the output image.

Furthermore, in the mechanisms disclosed in the patent documents 1 to 5, there is a possibility that an isolated dot is generated, that tone jump occurs or that graininess deteriorates. For example, in the FM screen such as the mechanisms disclosed in the patent document 1, since the density of the image is reproduced with a minute density of dots, which are invisible (30 μm or less), some of the integrated (clustered) minute halftone dots may be thinned out and areas of colored pixels may be too small to reproduce dots stably.

On the other hand, in the AM screen such as the mechanism disclosed in the patent document 2, when some of the halftone dots are non-periodically thinned out, there may occur a case where some of the halftone dots are thinned out inside the halftone dots and a case where some of the halftone dots are thinned out outside the halftone dots. Accordingly, there may occur a phenomenon that the crush of some of the halftone dots is different from the crush of other halftone dots, which may result in image noises. In addition, a coloring material in a halftone dot portion may be made thin when many pixels are thinned out inside the halftone dots. However, when many pixels are thinned out outside the halftone dots, since the size reduction of the halftone dots is significant but an operation of thinning out the coloring material in the halftone dot portion is weakened, an effect of making the halftone dots uniformly thin can not be expected. In particular, since the size of the halftone dots becomes small in highlight tone area (low density area), there are high possibilities that the above-mentioned problems occur.

In addition, even in the mechanism disclosed in the patent documents 3 to 5, there is no countermeasure against the generation of an isolated dot, tone jump, or graininess, so that it may cause serious problems.

SUMMARY OF THE INVENTION

The invention has a first object to provide mechanism, which can design parameters for gap generation and design a processing apparatus efficiently when pseudo-reproducing a density of a gradation image using halftone dots, regardless of a printing method such as an electrophotographic method using powder as a coloring material or an inkjet method using ink as a coloring material.

Further, the invention has a second object to provide mechanism, which can control errors in densities of an output image even with thinning out halftone dots when pseudo-reproducing a density of a gradation image using halftone dots, regardless of a printing method such as an electrophotographic method using powder as a coloring material or an inkjet method using ink as a coloring material.

Furthermore, the invention has a third object to provide mechanism, which can thins a coloring-material layer in a halftone-dot portion while suppressing errors in densities of the output image and preventing image quality from deteriorating, regardless of a printing method such as an electrophotographic method using powder as a coloring material or an inkjet method using ink as a coloring material.

A first image processing method according to one embodiment of the invention for generating a halftone image by forming a halftone dot represented by a set of one or plural output dots corresponding to an intensity of an input image signal while making a part of the dots constituting the halftone dot to be an actual non-output dot so as to reduce an amount of a coloring material of a halftone-dot portion, the image processing method including: holding in a predetermined storage medium halftone-dot profile data for forming the halftone dot corresponding to the intensity of the image signal and gap-size profile data representing a size of a set of the non-output dot; and generating the halftone dot comprising a gap having a size based on the gap-size profile data, a size of the halftone dot being based on the halftone-dot profile data.

That is, with regard to both of the halftone dot and the gap, the halftone-dot size and the gap size of the profile data for each intensity of an input image, which are registered as the threshold matrix in advance, are stored in the predetermined storage medium, and the gap dot is formed inside the halftone dot by referring to the respective data.

Here, the reason for describing "threshold-value set" is that arrangement of a plurality of threshold values determines characteristics of the halftone dot such as lines per inch and angle, that is, the halftone-dot profile.

According to a first image processing apparatus according to another embodiment of the invention is suitable for implementing the first image processing method according to the invention, and includes a profile data storage section that holds halftone-dot profile data representing a threshold-value set for forming the halftone dot corresponding to the intensity of the image signal and gap-size profile data representing a gap size, which is a size of a set of the non-output dot; and a calculating section that generates binarized data, which can generate a halftone dot comprising a gap having a size based on the gap-size profile data, a size of the halftone dot being based on the halftone-dot profile data.

Also, the first image forming apparatus is one having a function of the first image processing apparatus suitable for implementing the first image processing method, and includes a profile data storage section that holds halftone-dot profile data for forming a halftone dot corresponding to the intensity of the image signal and gap-size profile data representing a size of a set of the non-output dot; a calculating section that generates binarized data, which can generate a halftone dot comprising a gap having a size based on the gap-size profile data held by the profile data storage section, a size of the halftone dot being based on the halftone-dot profile data; and an image recording section that forms the gradation image having the actual non-output dot in the halftone dot, based on the binarized data generated by the calculating section.

A second image processing method according to further another embodiment of the invention for generating a halftone image by forming a halftone dot represented by a set of one or plural output dots corresponding to an intensity of an input image signal while making a part of the dots constituting the halftone dot to be an actual non-output dot so as to reduce an amount of a coloring material of a halftone-dot portion, the image processing method includes supplementing the halftone dot with the output dots so as to compensate a gap represented by the non-output dot. It is not necessary that the number of supplement is equal to number of the output dots thinned out for formation of the gap.

A second image processing according to further another embodiment of the invention is one for implementing the second image processing method, and includes a calculating section that generates binarized data, which can generate the halftone dot comprising a gap represented by the non-output dot number of which corresponds to the intensity of the input image signal, the halftone dot represented by the output dots number of which corresponds to the intensity of the input image signal; and a gap-dot correcting section that supplements the halftone dot with the output dots so as to compensate the gap generated by the calculating section.

Also, a second image forming apparatus is one having a function of the second image processing apparatus suitable for implementing the second image processing method, and includes a calculating section that generates binarized data, which can generate the halftone dot comprising a gap represented by the non-output dot number of which corresponds to the intensity of the input image signal, the halftone dot represented by the output dots number of which corresponds to the intensity of the input image signal; a gap-dot correcting section that supplements the halftone dot with the output dots so as to compensate the gap generated by the calculating section; and an image recording section that forms the gradation image having the actual non-output dot in the halftone dot, based on the binarized data, which the gap-dot correcting section supplements with the gap.

For example, it is preferable that when the intensity of the image signal is in a predetermined range exceeding a predetermined value, while contour dots, which are output dots contribute to formation of a contour of the halftone dot, is maintained to be the output dot, apart of dots inside the contour dots is made to be the actual non-output dot. That is, it is preferable that formation of the halftone dot and formation of the gap are synchronized while the gap dot is formed inside the halftone dot.

Also, a part of dots inside contour dots may be made to be a real non-output dot on electronic data representing the halftone dot. That is, a pure-electronic system for thinning out an image recording signal inside the halftone dot may be provided. Alternatively, a system for making modulation based on the binarized data generated by the binarization processing section so that recording energy of the non-output dot inside the halftone-dot contour dots is reduced may be provided.

Also, a functional portion relating to the binarized-data processing in the image processing apparatus and the image forming apparatus according to the invention can be implemented by software with using an electronic computer (computer). A program therefor or a recording medium storing this program may be derived as the invention. The program may be provided with being stored in a computer readable storage medium or may be provided by means of distribution through radio or wired communication means.

According to the first image processing method/apparatus and image forming apparatus, the profile in which the halftone dot size and the gap size for each intensity of the input image are recoded is stored in the predetermined storage medium, and the halftone dot size and the gap size are determined based on the profile.

Thereby, by referring to the profile registered in advance, the halftone-dot processing can be executed while the gap is being formed. The gap size and gap appearance density can be changed by changing the profile data, and such an operation is facilitated. By changing the profile data, a halftone-dot image having a gap of different characteristic can be generated easily.

According to the second image processing method/apparatus and image forming apparatus, since the output dots are supplemented to the halftone dot so that the generated gap is compensated, supplementing the output dots by an amount equal to decrease in the output image density compared to originally output density can enhance the density. Thereby, an error of the output image density can be reduced.

Also, if while contour dots, which are output dots contribute to formation of the contour of the halftone dot, is maintained to be the output dot, apart of dots inside the contour dots is made to be the actual non-output dot only when the intensity of the image signal is in a predetermined range exceeding a predetermined value, a layer thickness of a coloring material inside the halftone dot can be thinned without deforming the contour shape of the halftone dot formed by a toner or ink. Thereby, tone jump and deterioration of that graininess can be prevented, and the coloring material of the halftone dot portion can be thinned effectively without image quality deteriorated. Also, since a ratio of an amount of the coloring material contributing to light absorption increases, a consumption amount of the coloring material can be reduced. Also, generating of the halftone dots and generating of gap dots are synchronized to thereby facilitate control, which is made when the gap dot is formed inside the halftone dot.

BRIEF DESCRIPTION OF THE DRAWINGS

FIG. 2 is a diagram illustrating a configuration of a binarization processing section according to the first embodiment.

DETAILED DESCRIPTION OF THE EMBODIMENTS OF THE INVENTION

Hereinafter, embodiments of the invention will be described in detail with reference to the accompanying drawings.

Overall Configuration of Image Forming Apparatus

First Embodiment

Figure 1:
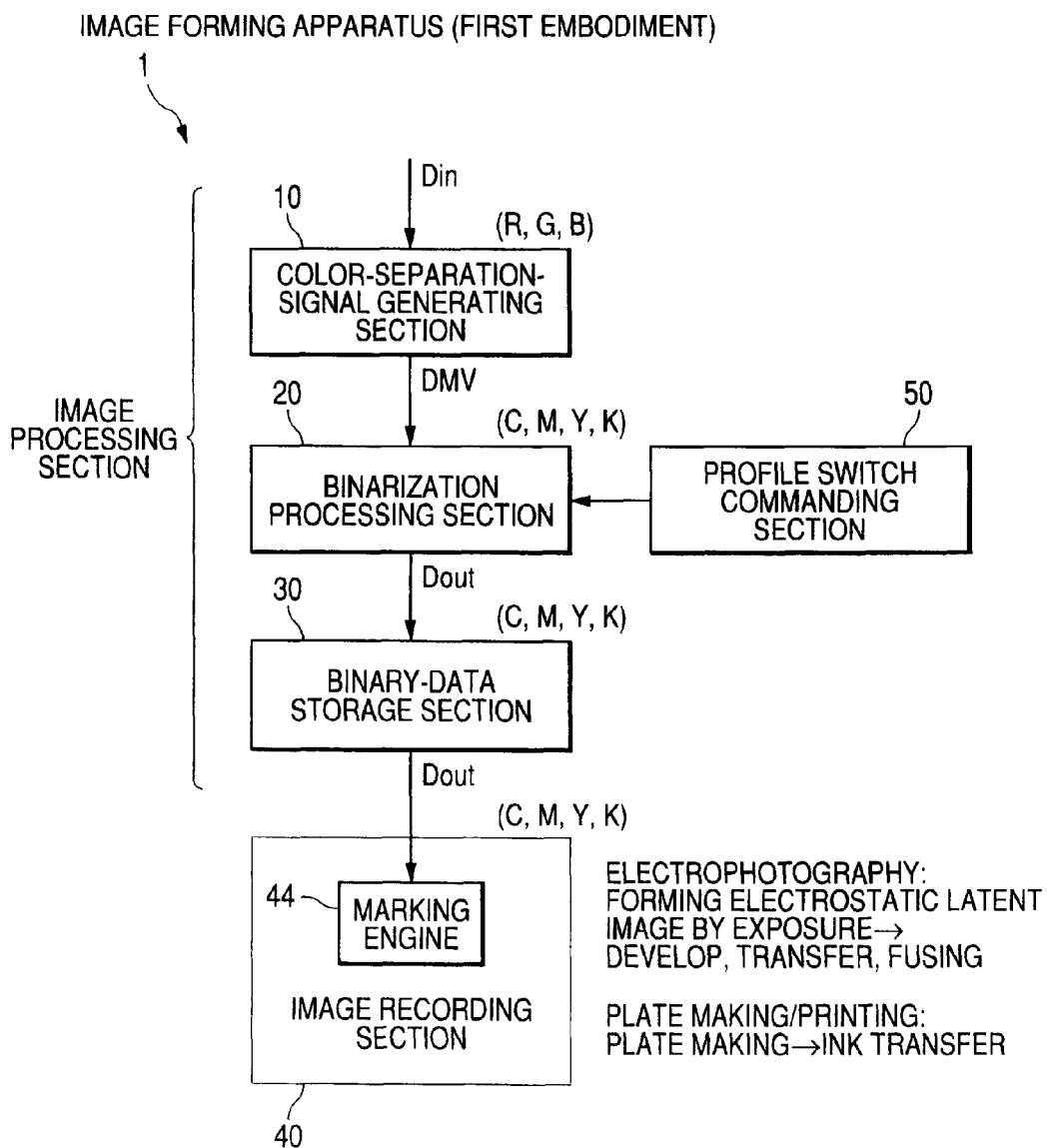
FIG. 1 is a diagram illustrating an overall outline of an image forming apparatus according to a first embodiment.

FIG. 1 is a diagram illustrating an overall outline of an image forming apparatus according to a first embodiment, with focusing attention on an image processing section (an image processing apparatus), which is involved in a binarization process, and an image recording section in a printing apparatus employing an electrophotographic method, an inkjet method or the like. As shown in the figure, an image forming apparatus 1 according to the first embodiment includes a color-separation-signal generating section 10, a binarization processing section 20, a binary-data storage section 30, an image recording section 40, and a profile switch commanding section 50. The color-separation-signal generating section 10, the binarization processing section 20, and the binary-data storage section 30 make up the image processing section (image processing apparatus), which is involved in the binarization process.

The color-separation-signal generating section 10 acquires image data Din having a relatively high number of bits (for example, 8 to 10 bits) for each of the color components of red (R), green (G), blue (B), for example, from an image input terminal such as a personal computer connected through an image reading unit or a communication interface (not shown) provided at a previous stage of the color-separation—signal generating section 10, and converts the acquired image data Din_R, Din_G, and Din_B for each of the color components into color separation data for each of the color components of C (cyan), M (magenta), Y (yellow), K (black) (hereinafter, referred to as multilevel image data DMV) corresponding to the toner colors, which are to be processed by the image recording section 40. For example, multilevel digital data R, G and B, each having several bits, is converted into multilevel digital data C, M, Y and K each having the same several bits. This color conversion process employs a process step of RGB data→Lab data→YMCK data.

In addition, in stages previous or next to the color-separation-signal generating process (a stage prior to the binarization processing), specific image processes (pre-processes) such as a background removal process, a magnification control process, a contrast adjustment (density adjustment) process, a color correction process, a filtering process, a TRC (Tone Reproduction Control) correction process (also referred to as gradation correction process) and the like are performed. These processes are well known in the related art, and therefore, explanation thereof will be omitted.

The binarization processing section 20 applies a screen process to the respective multilevel image data DMV_C, DMV_M, DMV_Y, and DMV_K for the respective input color components to generate binarized data (one bit data). At this time, the binarization processing section 20 acquires appropriate binarization processing parameter for each toner color, from the profile switch commanding section 50. For example, the binarization processing section 20 generates a binarized recording signal Dout, which represents the density of a gradation image in a pseudo manner by the size of the colored dots called halftone dots, from the multilevel digital data C, M, Y and K, which are multilevel image information having density gradation, and stores the generated binarized recording signal Dout in the binary-data storage section 30.

The image recording section 40 has a marking engine section 44 for reading out the binarized recording signal Dout generated by the binarization processing section 20 from the binary-data storage section 30 and then performing an image recording process. The marking engine section 44 may use various methods such as an electrophotographic method in which an electrostatic latent image is formed by exposure and then the latent image is developed, transferred and fused by using toner as the coloring material, an inkjet method of using ink as the coloring material, or a plate printing method (for example, lithographic method) of transferring ink on the recording paper using a prepared printing plate.

Configuration of Binarization Processing Section

First Embodiment

FIG. 2 is a diagram illustrating a configuration of the binarization processing section 20 (binarization processing section 20 of the first embodiment) used in the image forming apparatus 1 according to the first embodiment. In addition, FIGS. 3 and 4 are diagrams explaining basic characteristics of a gap formation process executed in the binarization processing section 20 according to the first embodiment.

Here, FIG. 3 is a diagram showing an example of a gap-size profile, which represents characteristics of threshold-value data for gap formation and is used in the gap formation process according to this embodiment. Further, FIG. 4(A) is a diagram showing an example of an image generated by a binarization process of a related art. FIG. 4 is a diagram showing an example of an image (A) generated by a usual binarization process, and images (B) and (C) generated by using the gap size profile shown in FIG. 3 according to this embodiment.

Figure 3A:
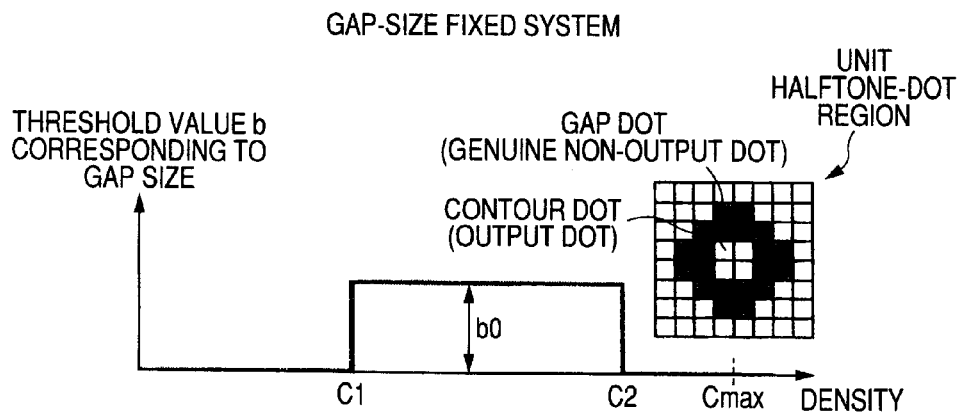
FIG. 3 is a diagram showing an example of a gap size profile representing characteristics of threshold data for gap formation.
Figure 3B:
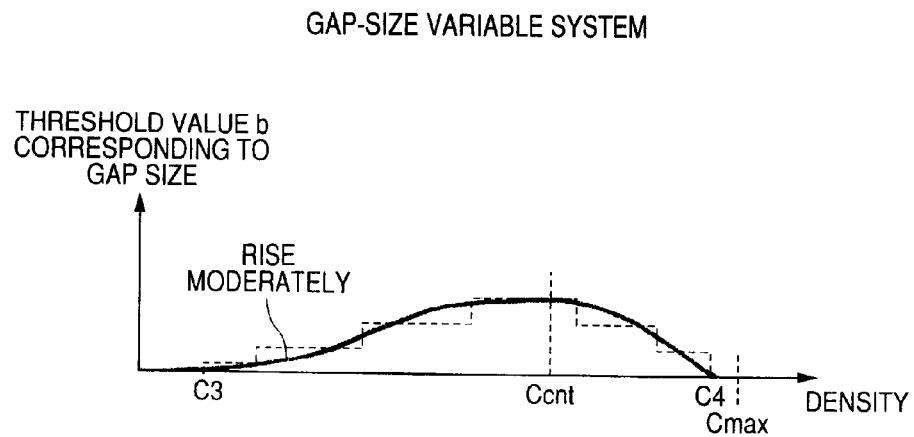
Figure 4A:
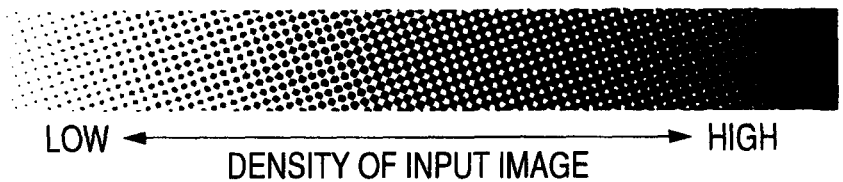
FIG. 4 is a diagram showing an example of an image (A) generated by a usual binarization process, and images (B) and (C) generated by using the gap size profile shown in FIG. 3 according to this embodiment.
Figure 4B:
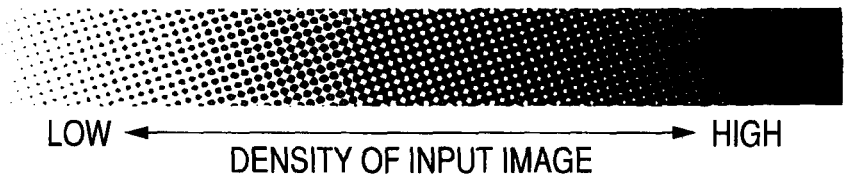
Figure 4C:
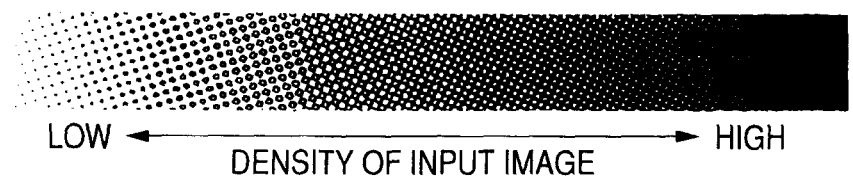

In FIGS. 3(A) and 3(B), reference numerals C1 and C3 each denote a density giving a gap-formation starting point on a low-density side, and reference numerals C2 and C4 each denote a density giving a gap-formation starting point on a high-density side. In addition, in FIG. 3(B), reference numeral Ccnt denotes a density giving the maximum value of the number of gaps, that is, a density at which the number of gaps changes from increase to decrease. In particular, the reference numeral Ccnt is the first value at which all binarization data representing halftone dots has become output dots ("1"), when the intensity of the multilevel image data DMV (corresponding to the density of an input image) representing the input image is changed from the low-intensity side.

The setting of densities C1 and C3, which gives the gap-formation starting point on the low-density side, may be considered to be essential to arrange the white dots (non-output dots) inside the halftone dots while maintaining the outside of the halftone dots formed of a set of black dots (output dots) as the black dots (output dots). On the other hand, densities C2 and C4 giving the gap-formation starting point on the high-density side are set to arrange white dots (non-output dots) within the halftone dots only in an intermediate density region, but the densities C2 and C4 are not essential to the first embodiment. A density range in which white dots (non-output dots) are arranged inside the halftone dots may be in a range from the densities C1 and C3 giving the gap-formation starting point on the low-density side to the maximum density Cmax.

The binarization processing section 20 according to the first embodiment has features that it includes a plurality of sets of comparators for binarization and threshold-value matrixes, and that a plurality of calculation processors for performing a logic operation for binary data output from the comparators, as compared with conventional examples. In addition, the respective sets of the comparators for binarization and the threshold-value matrixes are modules, which can form the same halftone-dot structures, but are characterized by the values of the threshold-value matrixes.

Specifically, as shown in the figure, the binarization processing section 20 according to the first embodiment includes three comparing sections 21, 22 and 23 for performing a comparison process for binarization by referring to the multilevel data to be processed and the threshold-value matrix, two binary calculating sections 26 and 27 for performing a logic operation for binary data output from the comparing sections 21, 22 and 23, and a threshold-value-matrix storage section 29 (an example of a profile data storage section).

The first comparing section 21 corresponds to a first halftone-dot processing section. A second halftone-dot processing section includes the second and third comparing sections 22 and 23 and the first binary calculating section 26. In addition, a gap forming section 28 for forming gaps in the center portion of the halftone dots generated by the first comparing section 21 while maintaining a contour of the halftone dots includes the second and third comparing sections 22 and 23 and the first and second binary calculating sections 26 and 27.

Further, an algorithm for generating the gradation image in the second halftone-dot processing section including the second and third comparing sections 22 and 23 and the first binary calculating section 26 is basically similar to an algorithm for generating a halftone-dot image (black dots) as in the first comparing section 21 (that is, the first halftone-dot processing section), even though threshold-value matrixes MTX1 referred to by these algorithms are different.

The threshold-value-matrix storage section 29 outputs threshold values corresponding to coordinate values within the matrixes. For example, the threshold-value-matrix storage section 29 has a halftone-dot profile storage section 29*a* and a gap-profile storage section 29*b*.

The halftone-dot profile storage section 29*a* stores profile data fundamental to forming the halftone dots. Specifically, the halftone-dot profile storage section 29*a* stores a first threshold-value matrix MTX1, which defines halftone-dot sizes corresponding to densities of the input image, that is, defines the densities of the input image for generating the halftone dots. The first threshold-value matrix MTX1 gives a halftone-size profile including a set of threshold-value data for formation of halftone dots used in the halftone-dot forming process. Although the first threshold-value matrix MTX1 is prepared so that a dot pattern similar to a conventional halftone-dot growth can be basically output, the first threshold-value matrix MTX1 is different from the conventional halftone-dot growth in that the number of output dots increases gradually within a unit halftone-dot region until the density of the input image reaches from "0" to a transition-point density Ccnt, and that all the dots within the unit halftone-dot region become output dots after the density of the input image exceeds the transition-point density Ccnt.

The gap-profile storage section 29*b* stores profile data, which defines gap sizes corresponding to the densities of an input image, that is, defines the densities of the input image for generating the gaps. Specifically, the gap-profile storage section 29*b* stores second and third threshold-value matrixes MTX2 and MTX3 giving gap-size profile including a set of threshold-value data for gap formation used in the gap forming process.

Here, the gap-size profile data (that is, threshold-value data) stored in the gap-profile storage section 29*b* makes the gap forming section 28 to be able to generate halftone dots having gaps of a size according to the gap-size profile data.

For example, the second threshold-value matrix MTX2 mainly defines gap sizes on the low-density side in a middle density region of the multilevel image data DMV. The third threshold-value matrix MTX3 mainly defines gap sizes on the high-density side in the middle density region of the multilevel image data DMV. A combination of the both matrixes defines gap sizes in the entire middle density region of the multilevel image data DMV. "Combination of the both matrixes" in the first embodiment actually refers to a logic synthesis for a result of the comparison with reference to the threshold-value matrixes MTX2 and MTX3.

The gap-size profile has a basic characteristic that when an input density exceeds a predetermined density, some of halftone dots (black dots: output dots) are made to be white dots (non-output dots) to form gaps, to thereby reduce an amount of coloring material on the entire halftone dots. In other words, the gap-size profile has a characteristic that gaps are not formed within integrated (clustered) minute halftone dots by not forming the gaps until the density of the input image exceeds the predetermined density. Reproducibility of halftone dots deteriorates when gaps are generated in highlight tone area where a dot size is small. This problem can be overcome by forming the gaps with setting a relatively high density as the gap-formation starting point.

In particular, as shown in the right upper portion of FIG. 3(A), within the unit halftone-dot region, while maintaining a contour of a halftone dot, that is, while maintaining the outmost output dots in lateral, longitudinal, and oblique directions (hereinafter, referred to as "outline dots"), which contribute to the formation of a contour of the halftone dots, as output dots, the gaps are formed by making some dots inside the outline dots be real non-output dots. That is, while maintaining coloring material of contour portion of the halftone dots to a predetermined amount, the amount of coloring material inside the contour portion of halftone dots can be appropriately reduced. In this case, generating of the halftone dots and generating of gap dots are synchronized to thereby facilitate control, which is made so that the gap dots are surely formed inside the halftone dots.

Further, in a case in which a plurality of non-output dots are formed inside the outline dots, if the non-output dots are isolated from one another inside the outline dots, pixels to be thinned out inside the halftone dots are scattered, which may reduce an effect of making the coloring material of the halftone dots thin. To avoid this problem, it is preferable to gather the plurality of non-output dots into a cluster such that the plurality of non-output dots are connected to one another, if at all possible, without isolating the plurality of non-output dots from one another. In addition, since output dots are scattered if output dots of the halftone dots exist in a cluster composed of the non-output dots, it is preferable to form the cluster with only the non-output dots. Also, from a point of view of maintaining contour, it is preferable to make the shape of a cluster composed of non-output dots resemble the shape of the outline of the halftone dots as much as possible.

For example, since halftone dots having sizes corresponding to the densities are formed by increasing output dots such that a set of black dots (output dots) has a roughly circular shape, it is preferable to circularly thin out the recording signals (output dots) inside the halftone dots having the roughly circular shape, that is, to increase the number of non-output dots gradually from the center of the halftone dots such that the set of non-output dots has a roughly circular shape. For example, when four non-output dots are formed inside the halftone dots, it is not preferable that four non-output dots are not arranged in line in the lateral, longitudinal, or inclined direction, but preferable that two non-output dots are arranged in the lateral direction and the other two non-output dots in the longitudinal direction. Internal output dots are converted (thinned out) into non-output dots such that the output dots are arranged in a roughly ring shape when viewing the entire "halftone dots having gaps" as a final result.

For example, the gap-profile storage section 29b stores profile data according to one or both of a gap-size fixed system shown in FIG. 3(A) and a gap-size variable system shown in FIG. 3(B).

Here, a threshold value b corresponding to a gap size shown in FIG. 3(A) indicates a value corresponding to the gap size, but does not indicate the size of the gap pre se. More specifically, the threshold value b corresponding to a gap size indicates a "threshold value for determining whether or not a pixel having a predetermined density D and a threshold value Th is a gap". For example, when b is equal to 128 (50%), the number of gap dots is equal to 50 if the size of the threshold-value matrix is 10×10, and it is equal to 128 if the size of the threshold-value matrix is 16×16.

The value of the gap size b shown in FIG. 3(A) is an example, and a plurality of profiles having various values obtained by modifying the gap size may be prepared. Similarly, a characteristic line shown in FIG. 3(B) is an example, and a plurality of profiles obtained by modifying the variation amount (including maximum value) of the characteristic line in various ways may be prepared. In any cases, a certain correspondence relationship should exist between the density of the input image and the gap size.

Further, when the plurality of profiles are stored, in actuality, one of the profiles is selected and used according to its application on the basis of a user's instruction through the profile switch commanding section 50. Halftone-dot images with gaps having different characteristics can be easily generated by changing the used profile.

Here, the gap-size fixed system refers to a system of forming a gap having a fixed size b0 at nearly a center inside the halftone dots in a specific range (C1 to C2) of the middle density region of density values of the multilevel image data DMV. On the other hand, the gap-size variable system refers to a system of dynamically (almost continuously) varying the gap size according to a density as shown by a solid line in FIG. 3(B), in a specific range (C3 to C4) of the middle density region of density values of the multilevel image data DMV such that the gap size increases gradually to the maximum value and decreases gradually after reaching the maximum value.

In the gap-size fixed system, since one kind of threshold value b0 corresponding to a gap size may only be designated in the specific range (C1 to C2) of the middle density region, a profile is relatively simple. However, a pseudo outline may occur at a position where gap is generated even though its generation mechanism is not evident. As one solution to this problem, the gap-size variable system for designating different gap sizes for different densities is employed.

Moreover, if relatively large (but smaller than halftone dots) gaps are formed within relatively small halftone dots, that is, if there are too many pixels thinned out inside the halftone dots, the coloring material of halftone dot portions may become too thin. To avoid this problem, in connection with variation characteristics of the gap size from the densities C1 and C3 giving the gap-formation starting point on the low-density side to the transition-point density Ccnt, it is preferable to smoothly increase the gap size. It is needless to say that the gap-size variable system is employed to give such a characteristic.

Further, in FIG. 3(B), the characteristic line (solid line) is shown as a smooth curve varying substantially continuously. However, when gaps are actually formed within the halftone dots, the solid line has a multi-step characteristic because any dot having a predetermined size in the threshold-value matrix is output or not output.

Furthermore, as shown by a dotted line in FIG. 3(B), as an intermediate system between the gap-size fixed system and the gap-size variable system, a system of varying the gap size with several steps according to a density such that the gap size increases gradually to the maximum value and decreases gradually after reaching the maximum value in the specific range of the middle density region of density values of the multilevel image data DMV can be employed.

Each of the comparing sections 21, 22, and 23, which is an example of a density/threshold-value comparing section, compares the multilevel image data DMV representing the density of an input image, that is, the density of an input multilevel image, with the threshold value of each of the threshold-value matrixes MTX1, MTX2 and MTX3 stored in the threshold-value-matrix storage section 29 to then output an binary image.

For example, the first comparing section 21 compares the multilevel image data DMV to be processed with the first threshold-value matrix MTX1. The second comparing section 22 compares the multilevel image data DMV to be processed with the second threshold-value matrix MTX2. The third comparing section 23 compares the multilevel image data DMV to be processed with the third threshold-value matrix MTX3.

The first binary calculating section 26 performs a predetermined logic operation (specifically, difference process) between second binary data Do2 output from the second comparing section 22 and third binary data Do3 output from the third comparing section 23.

The second binary calculating section 27 performs a predetermined logic operation (specifically, difference process) between first bitmap data BM1, which is the first binary data Do1 output from the first comparing section 21, and second bitmap data BM2, which is a result of the logic operation output from the first binary calculating section 26.

A result of the logic operation executed in the second binary calculating section 27 is temporarily held as a binarized recording signal Dout in the binary-data storage section 30. Then, the marking engine section 44 of the image recording section 40 uses the binarized recording signal Dout in the image recording process. That is, the marking engine section 44 serves as a recording-energy control section for recording images on the basis of the binarized recording signal Dout, which is binarization data making some dots inside the outline dots generated by the second binary calculating section 27 become actual non-output dots.

Procedure of the Halftone-Dot Process

First Embodiment

FIG. 5 and FIGS. 6(A) to 6(E) are diagrams illustrating the binarization process (specifically, halftone-dot process) executed in the binarization processing section 20 according to the first embodiment. Here, the following description will be given by assuming that the gap-profile storage section 29b stores the gap-size profile data of the gap-size variable system shown in FIG. 3(B).

Figure 5:
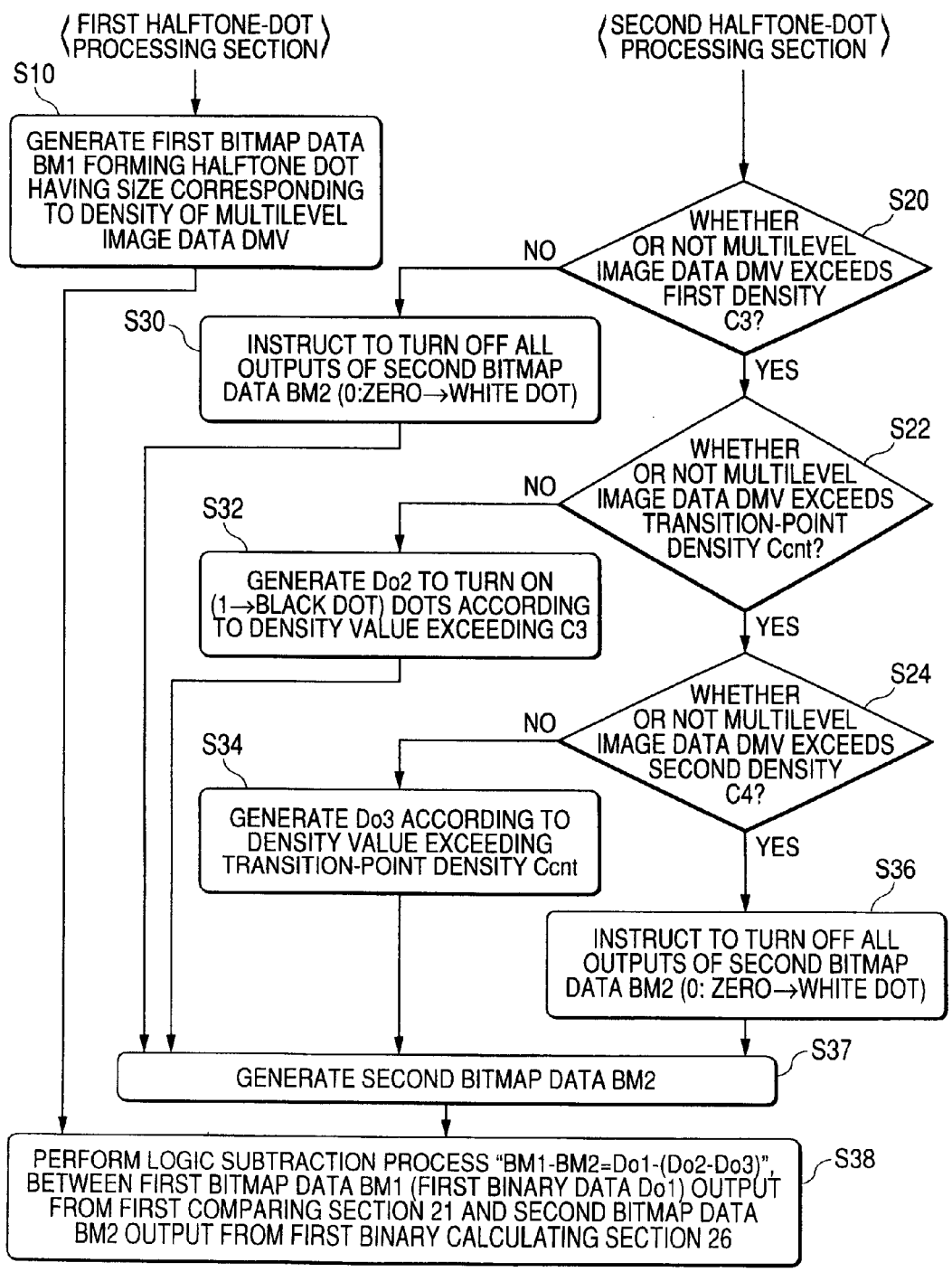
FIG. 5 is a flow chart illustrating an outline of a halftone-dot processing procedure by the binarization processing section of the first embodiment.
Figure 6:
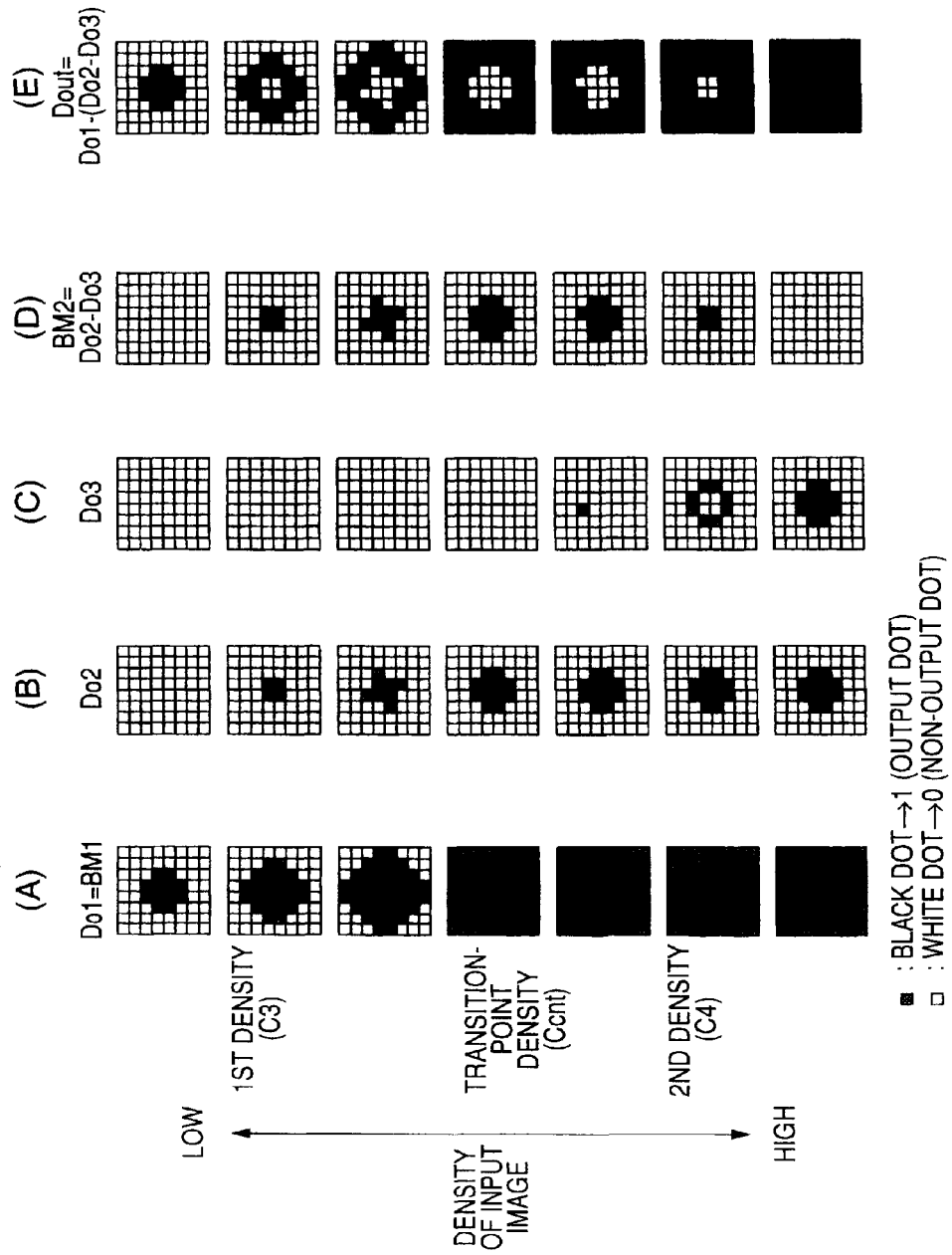
FIG. 6 is a diagram illustrating a procedure for generating ring-shaped halftone dots by the halftone dot process of the first embodiment.

FIG. 5 is a flow chart illustrating an outline of a process of the halftone-dot process by the binarization processing section 20 according to the first embodiment. FIGS. 6(A) to 6(E) are diagrams illustrating a process of generating ring-shaped halftone dots according to the halftone-dot process performed by the binarization processing section 20 of the first embodiment. For example, FIG. 6(A) shows an example of the first binary data Do1 output from the first comparing section 21, that is, the first bitmap data BM1. FIG. 6(B) shows an example of the second binary data Do2 output from the second comparing section 22. FIG. 6(C) shows an example of the third binary data Do3 output from the third comparing section 23. FIG. 6(D) shows an example of the second bitmap data BM2 output from the first binary calculating section 26. FIG. 6(E) shows an example of the binarized recording signal Dout output from the second binary calculating section 27.

The binarization processing section 20 according to the first embodiment has a first feature that when multilevel image data DMV having a density gradation is reproduced in a pseudo manner by the size of colored dots called halftone dots, the amount of coloring material is reduced by forming gaps inside the halftone dots if density of an input image lies within the density range from the gap-formation starting point on the low-density side to that on the high-density side.

Further, the binarization processing section 20 according to the first embodiment has a second feature that it employs a method of thinning out information inside the halftone dots on the binarized recording signal Dout, that is, a method in which two images, i.e., a normal halftone-dot image and an image representing a gap are generated and then a logic synthesis for the two images is performed in order to reduce the amount of coloring material inside the halftone dots.

Furthermore, the binarization processing section 20 according to the first embodiment has a third feature that it generates the halftone dots having a halftone-dot size and a gap size according to the profile by referring to profile data in which the halftone-dot size and the gap size for each density are recorded, in order to reduce the amount of the coloring material by using, for example, a method of forming gaps in a central portion of dots in the density specified by generating two images. Now, those characteristics will be described specifically.

The first comparing section 21 serving as the first halftone-dot processing section arranges the first bitmap data BM1 shown in FIG. 6(A) obtained by comparing the first threshold-value matrix MTX1 with the multilevel image data DMV so as to output a pattern of dots similar to a conventional halftone-dot growth (for example, as shown in FIG. 4(A)). That is, the first comparing section 21 generates the first bitmap data BM1 that forms a halftone dot having a size corresponding to the density of multilevel input image information (multilevel image data DMV) (S10).

The second comparing section 22 arranges the second binary data Do2 shown in FIG. 6(B) obtained by comparing the second threshold-value matrix MTX2 with the multilevel image data DMV so that the multilevel image data DMV is dot-grown in a pattern where a dot follows another dot of the first secondary data Do1 from the inside of dots of the first binary data Do1 (the first bitmap data BM1) toward the outside thereof where the density of the multilevel image data DMV is in a range of from a density C3 (first density) giving the gap-formation starting point on the low-density side to the transition-point density Ccnt. If the density of the multilevel image data DMV exceeds the transition-point density Ccnt, a state at the transition-point density Ccnt is maintained. In other words, when the multilevel image data DMV exceeds the first density C3 giving the gap-formation starting point on the low-density side, dots are grown according to the number of on-dots of the first bitmap data BM1.

The third comparing section 23 arranges the third binary data Do3 shown in FIG. 6(C) obtained by comparing the third threshold-value matrix MTX3 with the multilevel image data DMV so that dots are grown in a pattern where the inside of dots of the second binary data Do2 is filled with the dots from the outer side to the inner side of dots when the density of the multilevel image data DMV exceeds the density Ccnt giving the maximum value of the number of gaps (the transition-point density).

The first binary calculating section 26 generates the second bitmap data BM2 shown in FIG. 6(D) by performing a binary logic operation (logic subtraction process), which is "Do2−Do3", between the second binary data Do2 output from the second comparing section 22 and the third binary data Do3 output from the third comparing section 23.

A series of processes performed by the second halftone-dot processing section including the second comparing section 22, the third comparing section 23, and the first binary calculating section 26 is to form gaps inside the halftone dots according to the gap-size variable system (in this embodiment) or the gap-size fixed system when the gaps are formed in the halftone dots with the input density lying within the middle density region C3 to C4, and are processes for making the gap size correspond to the density of the input image. The purpose of the processes is as follows.

For example, according to the gap-size variable system, when the density of the multilevel input image information (multilevel image data DMV) is less than the first density C3, the second bitmap data BM2 is generated in such a manner that all outputs of the second bitmap data BM2 are turned off (0; zero→white dot/non-output dot) (S20—NO, S30). When the density of the multilevel image data DMV exceeds the first density C3 and less than the transition-point density Ccnt, the second bitmap data BM 2 is generated so that dots are turned on (1→black dot/output dot) in accordance with the value of density exceeding the first density C3 (S20—YES, S22—NO, S32).

In addition, when the density of the multilevel input image information (multilevel image data DMV) exceeds the transition-point density Ccnt at which all signals of the first bitmap data BM1 are turned on (1→black dot/output dot) and less than the second density C4, on-pixels (1→black dot/output dot) in the second bitmap data BM2 are sequentially turned off (0; zero→white dot/non-output dot) according to the value of density exceeding the transition-point density Ccnt (S22—YES, S24—NO, S34). Further, when the density of the multilevel input image information (multilevel image data DMV) exceeds the second density C4, all outputs of the second bitmap data BM2 are turned off (0; zero→white dot/non-output dot) (S24—YES, S36).

Thus, in the second bitmap data BM2, which is an output result of the second halftone-dot processing section, as shown in FIG. 6(D), a halftone-dot image is generated so that black dots increase gradually in the specific range C3 to C4 of the middle density region of the density values of the multilevel image data DMV and decrease gradually after reaching the maximum value at the transition-point density Ccnt. That is, halftone dots corresponding to subsequent gaps (non-output dot) (a result of process in the second binary calculating section 27) can be dynamically changed according to the density.

That is, in the second halftone-dot processing section including the second comparing section 22, the third comparing section 23, and the first binary calculating section 26, the second bitmap data BM2 are generated as binarization data indicating non-output dots, which are represented by a set of output dots and dynamically corresponds to the intensities of the multilevel image data DMV (corresponding to the densities of the input image) in a range from the first density C3 to the second density C4.

In particular, in this example, while the gap-size variable system is employed, gaps are formed inside the halftone dots only in the middle density region. Therefore, the number of non-output dots takes its maximum value at the transition-point density Ccnt at which the first bitmap data BM1 all become "1," and the number of non-output dots gradually decreases from the maximum value before and after the transition-point density (from C3 to Ccnt and from Ccnt to C4).

Thereafter, the second binary calculating section 27 generates the binarized recording signal Dout shown in FIG. 6(E) by performing a binary logic operation (logic subtraction process), which is "BM1−BM2=Do1−(Do2−Do3)", between the first bitmap data BM1 (the first binary data Do1) output from the first comparing section 21 and the second bitmap data BM2 output from the first binary calculating section 26.

As shown in FIG. 6(E), the binarized recording signal Dout output from the second binary calculating section 27 is binary data having a gap inside the halftone dot in the middle density region. Further, in this embodiment, since the gap-size variable system is employed, it is possible to obtain the profile shown in FIG. 3(B) in which the gap size varies according to the density so that the gap size becomes a maximum at substantial center of the middle density region and gradually decreases in the density region before and after the substantial center.

Furthermore, even though not shown, according to the gap-size fixed system, the second bitmap data BM2 is generated in such a manner that all outputs of the second bitmap data BM2 are turned off (0; zero→white dot/non-output dot) when the density of multilevel input image information (multilevel image data DMV) is less than the first density C1 and dots the number of which corresponds to the gap size b are turned on (1→black dot) when the density of the multilevel input image information (multilevel image data DMV) is equal to or larger than the first density C1 and less than the second density C2, without the determination process on the transition-point density and processes on the basis of the determination result in the gap-size variable system. In addition, when the density of the multilevel input image information (multilevel image data DMV) exceeds the second density C2, all outputs of the second bitmap data BM2 are turned off (0; zero→white dot).

According to the halftone-dot processing procedure executed by the binarization processing section 20 according to the first embodiment, it is possible to reliably generate the binarized recording signal Dout having a gap inside the halftone dot without damaging the contour shape of the halftone dots. Also, it is possible to remove the coloring material inside the halftone dots or to reduce the layer thickness in an output image by means of gaps inside the halftone dot in data. Thus, a high transferability of the coloring material and an improved image quality can be obtained. Also, since a ratio of the amount of coloring material contributing to light absorption can increase, it is possible to reduce the amount of coloring material consumption.

In addition, at first two images are generated, i.e., a normal gradation image and an image representing a gap are generated. Then, a logic synthesis for the two images is executed so as to form gaps inside the halftone dots. Thereby, the amount of coloring material inside the halftone dots can be reduced. Therefore, there is an advantage in that the gaps can be formed relatively simply inside the halftone dots by using a digital signal processing.

Moreover, the profile data (i.e., threshold-value data) defining the gap sizes corresponding to the densities of the input image is stored in the gap-profile storage section 29*b*, and the gaps are formed by comparing the threshold-value data with the multilevel image data DMV. Therefore, only by changing the profile, a single processing device can generates a halftone-dot image with gaps having different characteristics. Accordingly, even when the gap size or the density at which the gaps are generated changes, there is no need to re-design parameters for the binarization processing. As a result, parameters for gap generation can be efficiently designed.

Modification of the First Embodiment

Figure 7:
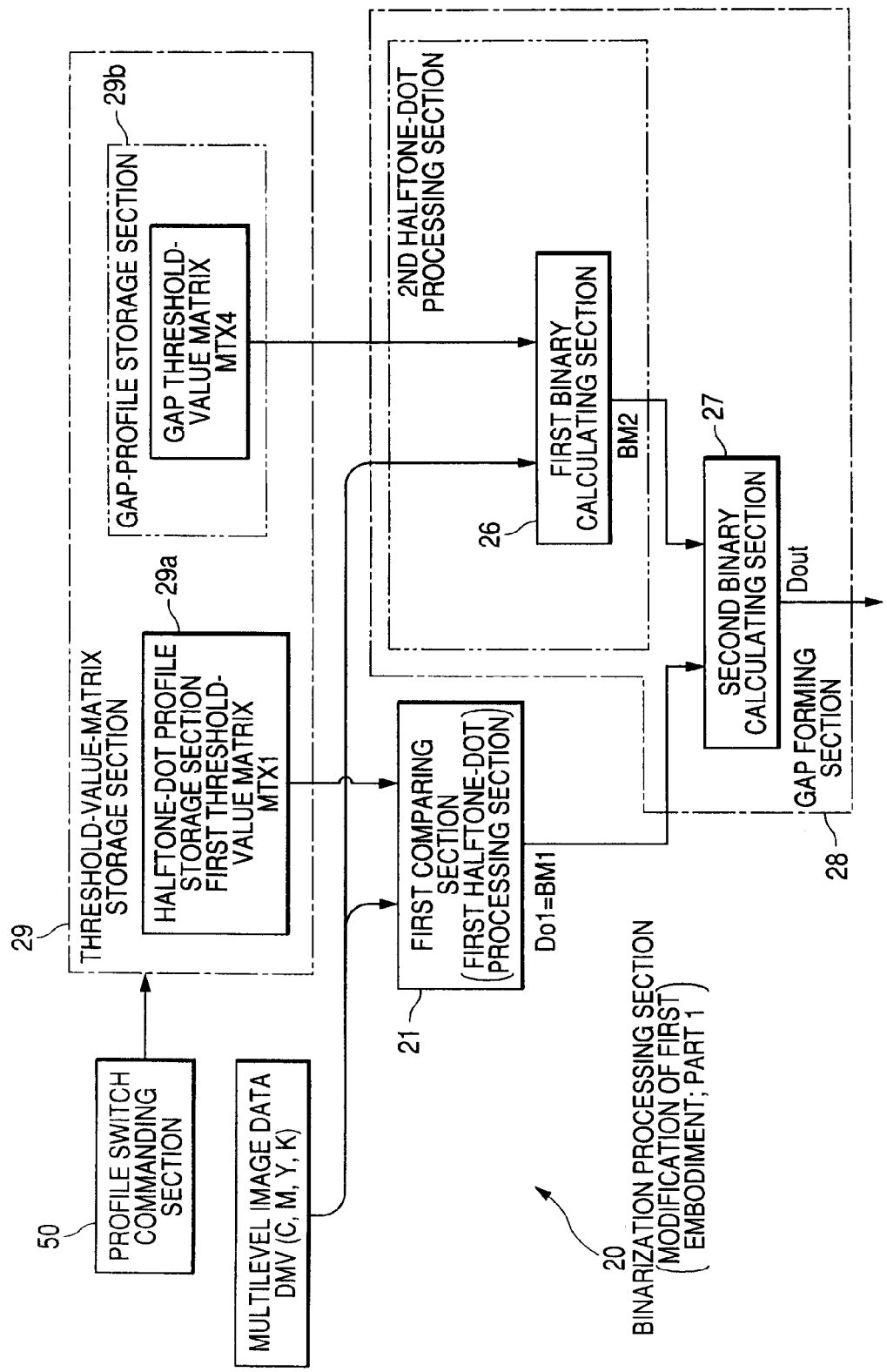
FIG. 7 is a diagram illustrating a configuration of a binarization processing section according to a first modification of the first embodiment.

Further, in the first embodiment, when an image representing gaps shown in FIG. 6(D) is generated, the second threshold-value matrix MTX2 specifying a gap size mainly in the low-density side and the third threshold-value matrix MTX3 specifying a gap size mainly in the high-density side are prepared, and a combination of the both matrixes specifies a gap size in the entire middle density region of the multilevel-image data DMV. However, in a first modification shown in FIG. 7, a gap threshold-value matrix MTX4, which gives halftone dot pattern shown in FIG. 6(D) specifying a gap size in the entire middle density region of the multilevel-image data DMV, may be stored in the gap-profile storage section 29*b* in advance. The first binary calculating section 26 may perform a binarization process with using the gap threshold-value matrix MTX4. According to this configuration, it is possible to reduce the number of threshold-value matrix to be used. In addition, as an example of the gap threshold-value matrix MTX4 giving the halftone dot pattern shown in FIG. 6(D), it is preferable that the gap threshold-value matrix MTX4 include two threshold values in the high and low-density sides in one coordinate.

Furthermore, in the first embodiment, the gaps are formed inside the halftone dots by generating two images, i.e., the normal halftone-dot image shown in FIG. 6(A) and the halftone-dot image representing the gaps shown in FIG. 6(D) and then the two images are logically combined. However, a method (referred to as second modification) in which threshold values or densities of an input image are converted into a halftone-dot image having a gap shown in FIG. 6(E) and then the binarization process is performed may be employed. Even though not shown, a configuration in which complement of the gap dots in the second and third embodiments (described later) are not performed may be used.

According to the configuration of the second modification, it is possible to omit the plurality of binarization processing sections for generating a basic halftone-dot image (an example of the binary image) and a halftone-dot image (an example of the binary image; corresponding to FIG. 6(D)) corresponding to a gap image (an example of the binary image) for forming the gaps inside the halftone dots, and a function section for combining these two binary images. Accordingly, it is possible to efficiently generate the halftone-dot images having the gaps.

In addition, although not shown, employed may be a method (referred to as third modification) of modulating recording energy of non-output dots inside an outline halftone dot on the basis of the first bitmap data BM1 and the second bitmap data BM2 generated by the binarization processing section 20, in order to reduce the amount of the coloring material. In the first embodiment, a completely electronic process is performed to make some dots inside the outline dots become non-output dots in the binarized recording signal Dout, which is electronic data representing the halftone dots. To the contrary, the third modification uses the control of the recording energy in the image recording section 40.

In this case, it is preferable that the image recording section 40 is provided with a modulation control section at a stage previous to the marking engine section 44. The modulation control section receives the first bitmap data BM1 (the first binary data Do1) output from the first comparing unit 21 at an on/off control input terminal 72a thereof. Also, the modulation control section receives the second bitmap data BM2 output from the first binary calculating section 26 at a modulation control terminal thereof.

The modulation control section generates the output modulation data DEX with using the first bitmap data BM1 as an on/off control signal for exposure and using the second bitmap data BM2 as output modulation control data. The marking engine section 44 controls the recording energy of the halftone dots based on the output modulation data DEX so that the amount of the coloring material inside the halftone dots is reduced.

Specifically, an exposure is performed when the first bitmap data BM1 (on/off control signal) is turned on (a hatched dot portion in FIG. 6(A)). At this time, a 100% exposure is performed when the second bitmap data BM2 (output modulation data) is "0; zero (a hatched dot portion in FIG. 6(D))", and performs an exposure with a small amount of light (for example, less than 50%) when the second bitmap data BM2 (output modulation data) is "1 (a white dot portion in FIG. 6(D))".

Thus, it is possible to make dots having the second bitmap data (output modulation data) of "1" become substantial non-output dots. In addition, the real non-output dots in the first embodiment and the substantial non-output dots in the third modification are collectively called actual non-output dots.

The second bitmap data BM2 (output modulation data) is obtained by the same process as in the first embodiment. If an exposure is performed on the second bitmap data BM2 when only the first bitmap data BM1 (on/off control signal) is turned on, it is possible to obtain a printed pattern having gaps inside the halftone dots in the middle density region, as shown in FIG. 6(E).

Thus, in actuality, the third modification can obtain the same halftone-dot output image as in the first embodiment. Moreover, in the output image, it is possible to remove the coloring material inside the halftone dots or to reduce the layer thickness by reducing the amount of exposure inside the gradation image. Accordingly, a high transferability of the coloring material and an improved image quality can be obtained. Also, since a ratio of the amount of coloring material contributing to light absorption can increase, it is possible to reduce the amount of coloring material consumption.

Further, the first embodiment has an advantage in that the gaps can be formed relatively simply inside the halftone dots by using a digital signal processing because the gaps are formed inside the halftone dots by generating two images, i.e., the normal gradation image and the image representing gaps, and then performing the logic synthesis for the two images. However, in the first embodiment, since the density of gaps in the electronic data (binarized recording signal Dout) becomes "0; zero", it is essentially impossible to freely adjust the density of gaps. Accordingly, in order to adjust the degree of thinness of the coloring material inside the halftone dots, there may arise a need to adjust the number of pixels to be thinned out inside the halftone dots.

On the contrary, in the third modification, since it is possible to adjust the amount of exposure when the second bitmap data BM2 (output modulation data) becomes "1 (a white dot portion in FIGS. 6(D) and 11(D))", there is an advantage in that the density of gaps can be freely adjusted even though the modulation controlling section is needed. Also, it is possible to adjust the degree of thinness of the coloring material inside the halftone dots while the number of pixels thinned out inside the halftone dots remains unchanged.

Configuration of Binarization Processing Section

Second Embodiment

Figure 8:
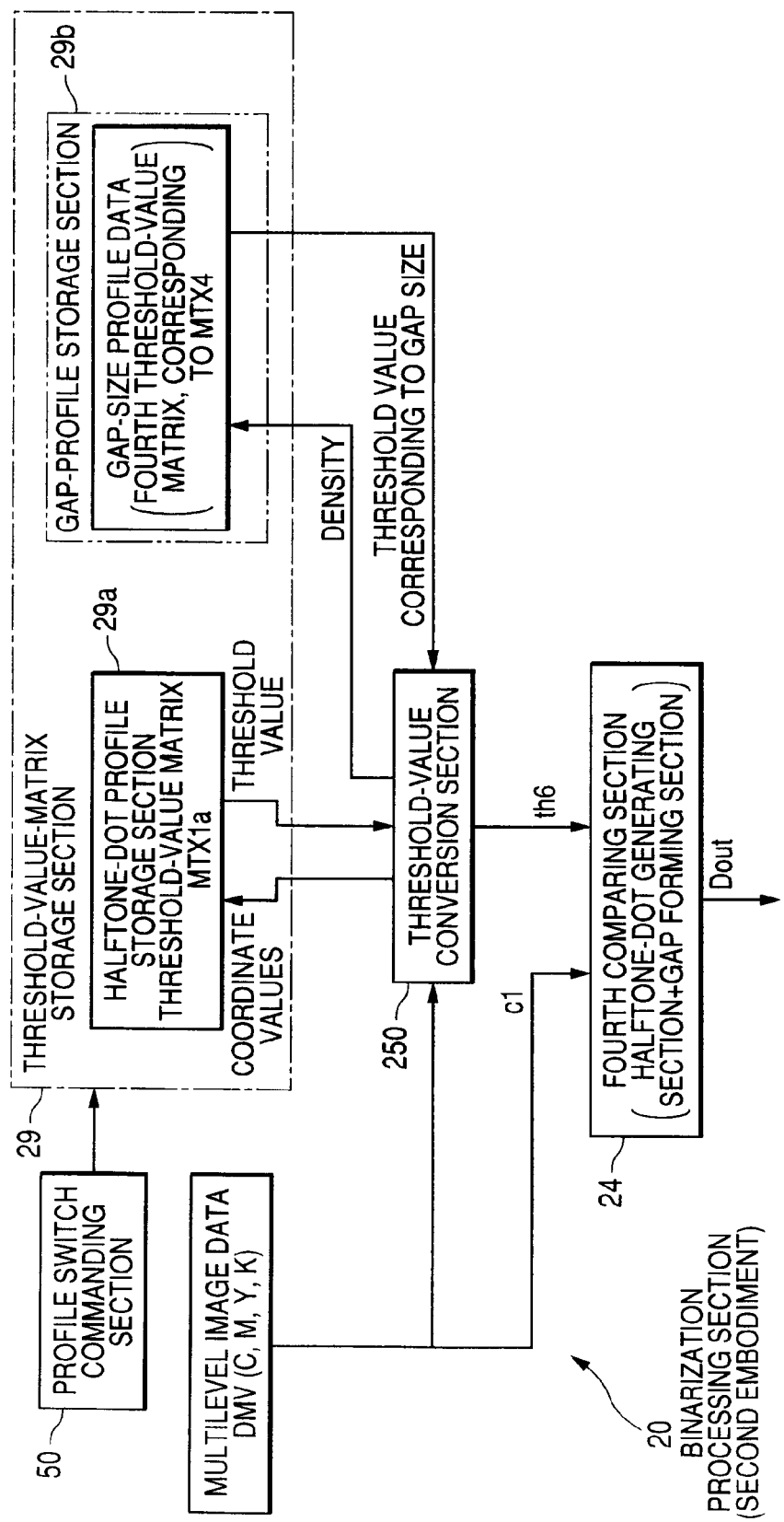
FIG. 8 is a diagram illustrating a configuration of a binarization processing section according to a second embodiment.

FIG. 8 is a diagram illustrating a configuration of the binarization processing section 20 (binarization processing section 20 of the second embodiment) used in an image forming apparatus 1 according to a second embodiment. The binarization processing section 20 of the second embodiment has a feature that it converts the threshold value of a first threshold-value matrix MTX1 stored in a halftone-dot profile storage section 29a for forming a normal halftone-dot image in advance so as to correct the number of gaps on the basis of the gap size stored in the gap-profile storage section 29b, and it uses the converted threshold value in a binarization process to generate a halftone-dot image with a gap having a predetermined size. A configuration of the second embodiment is similar to that of the second modification of the first embodiment. However, it has a characteristic in a method of converting a threshold value.

Specifically, in the binarization processing section 20 of the second embodiment, a halftone-dot profile storage section 29a stores a modified pattern (referred to as threshold-value matrix MTX1a) of the first threshold-value matrix MTX1 that can output a dot pattern similar to the conventional halftone dot growth. In more detail, output dots are formed around the center in a unit halftone-dot region until the density of the input image reaches from '0' up to a maximum density Cmax, and the number of output dots increases gradually toward the outside (dot grows toward the outside). For example, when the density of the input image is the minimum density ('0'), all dots in the unit halftone-dot region become non-output dots. When the density of the input image is the maximum density Cmax, all dots in the unit halftone-dot region become output dots.

Further, the binarization processing section 20 according to the second embodiment includes a threshold-value conversion section 250 and a fourth comparing section 24. The threshold-value conversion section 250 converts a threshold value read out from the halftone-dot profile storage section 29a while referring to a threshold value corresponding to a threshold value b corresponding to a gap size stored in the gap-profile storage section 29*b*. The fourth comparing section 24 performs a binarization process with using a result of the conversion performed by the threshold-value conversion section 250.

The threshold-value conversion section 250 has a function of a gap-dot correcting section, which supplements output dots to the halftone dot so as to compensate for generated gaps. In particular, the threshold-value conversion section 250 has a function of a threshold-value modifying section. The threshold-value modifying section modifies a threshold value, which corresponds to the intensity (multilevel-image data DMV representing the density of an input image) of an image signal to be processed, in halftone-dot profile data (first threshold-value matrix MTX1) stored in the halftone-dot profile storage section 29*a* by referring to a gap size, which corresponds to the intensity of the image signal to be processed, in the gap-size profile data stored in the gap-profile storage section 29*b* so as to obtain non-output dots. In the present embodiment, the threshold-value conversion section 250 has both functions of the gap-dot correcting section and the threshold-value modifying section.

For example, the threshold-value conversion section 250 converts a threshold value th1 of a coordinate value to be originally processed into an threshold value th6, by referring to a threshold value th1 of a coordinate value to be processed in the first threshold-value matrix MTX1 stored in the halftone-dot profile storage section 29*a* and a threshold value b corresponding to a gap size, which corresponds to the density value to be processed in the gap size profile stored in the gap-profile storage section 29*b*. The threshold-value conversion section 250 outputs the generated threshold value th6 to the halftone-dot processing section+the gap forming section, that is, the fourth comparing section 24 having a function of a calculating section for generating a binarization recording signal Dout, which represents a halftone dot having a gap represented by non-output dots number of which corresponds to the intensity of the input image signal and output dots the number of which corresponds to the intensity of the input image signal.

Here, the threshold-value conversion section 250 determines a reduction amount of threshold value according to the threshold value b corresponding to a gap size in the threshold-value conversion processing, and performs a threshold-value conversion processing in which the threshold value th1 in a portion other than gaps is reduced in accordance with the determined reduction amount to convert the threshold value th1 into the threshold value th6.

According to the above-described configuration of the second embodiment, it is possible to generate a halftone-dot image in which gaps are provided and output dots, number of which corresponds to number of the gaps, are added to an outside of a halftone dot, as will be described in detail below. In addition, it is possible to omit the plurality of binarization processing sections for generating a basic halftone-dot image (an example of a binary image) and a halftone-dot image (an example of a binary image; corresponding to FIG. 6(D)) corresponding to a gap image (an example of a binary image) for forming the gaps inside the halftone dot. As a result, it is possible to efficiently generate the halftone-dot image having the gaps.

Further, it is possible to supplement output dots (black dots) number of which corresponds to the number of gaps (non-output dots) formed in a halftone-dot portion (in this example, inside of the contour portion of the halftone dot) so as to attach the output dots to the contour portion of the halftone dot. Therefore, the output dots can be grown toward the outside of the halftone dot in accordance with the gap size.

In the second embodiment, 'the output dots the number of which corresponds to the number of gaps' does not mean that the number of output dots is necessarily equal to the number of gaps. This applies to a third embodiment to be described later. For example, if a unit halftone-dot region overlap a position where the density of the input image changes significantly, the gap size may be different from the growth size of the half tone dot toward the outside thereof. As a result, there is a possibility that a pseudo outline may be generated at a position where gaps are generated even though the gap-size variable system is employed.

Halftone-Dot Processing Procedure

Second Embodiment

FIG. 9 and FIGS. 10(A) to 10(D) are diagrams illustrating a binarization process (specifically, halftone-dot processing) in the binarization processing section 20 according to the second embodiment. Here, in the following description, it is assumed that the gap size profile data of the gap-size variable system shown in FIG. 3(B) is stored in the gap-profile storage section 29*b*.

Figure 9:
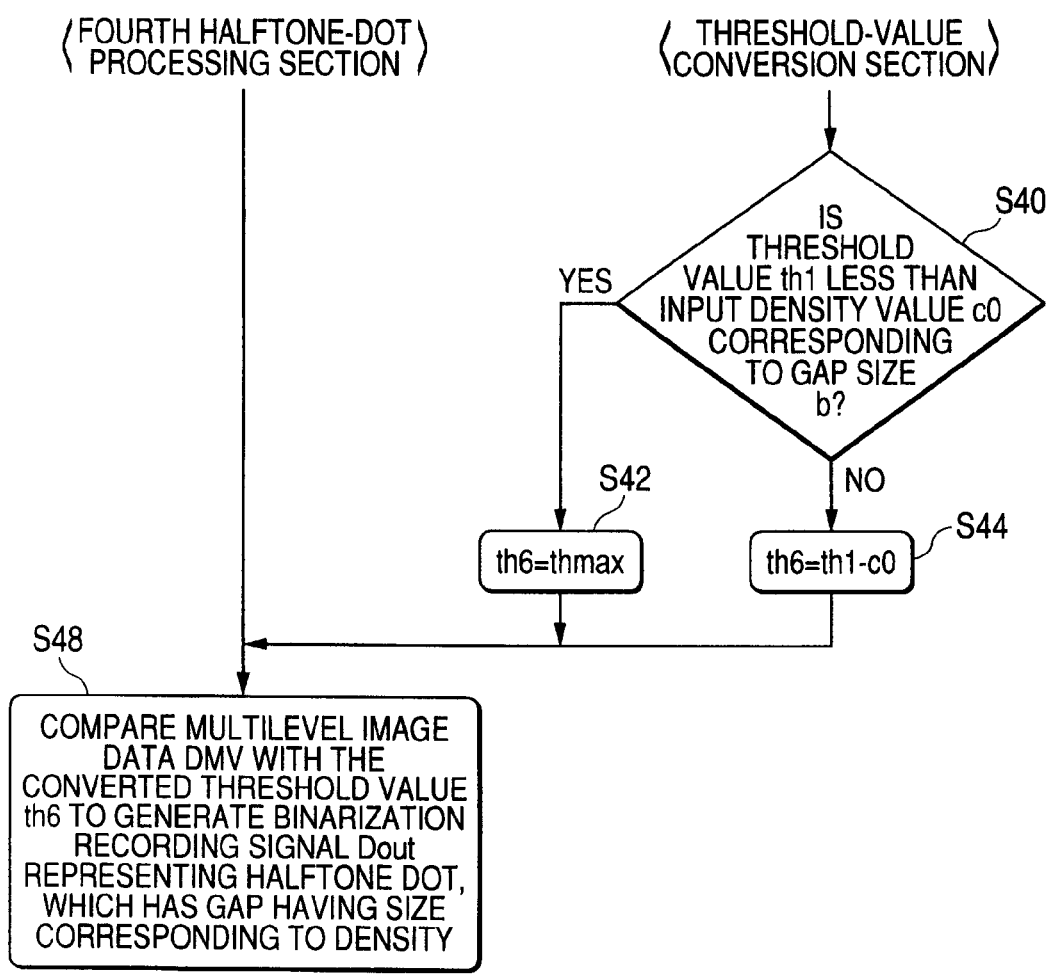
FIG. 9 is a flow chart illustrating an outline of a halftone-dot processing procedure by the binarization processing section of the second embodiment.

FIG. 9 is a flow chart illustrating an outline of a halftone-dot processing procedure performed by the binarization processing section 20 of the second embodiment. FIGS. 10(A) to 10(D) are diagrams illustrating an example of an output of halftone dots in a case where an image recording process is performed on a basis of the halftone-dot processing procedure performed by the binarization processing section 20 of the second embodiment. In particular, FIGS. 10(A) to 10(D) shows a function of the threshold-value conversion section 250, which supplements black dots at an outside of a halftone dot according to a formed gap.

The threshold-value conversion section 250 converts a threshold value th1 into a threshold value th6, by referring to each threshold value th1 in the first threshold-value matrix MTX1*a* read out from the halftone-dot profile storage section 29*a* and the threshold value b corresponding to the gap size, which corresponds to a value (the density of an input image) of multilevel-image data DMV to be processed and is read out from the gap-profile storage section 29*b*. Then, the threshold-value conversion section 250 transmits the converted threshold-old value th6 to the fourth comparing section 24.

Here, an input density value c0 specifying a threshold value b corresponding to a gap size corresponds to a reduction amount p of the threshold value. The reduction amount p is determined according to the threshold value b corresponding to a gap size. When number of gray-scale levels of the density of the multilevel-image data DMV is equal to number of threshold value steps (it is necessary that the unit halftone-dot region has dots number of which is equal to the number of gradation-scale levels of the density) of a threshold-value matrix MTX1*a*, the input density value c0 and the reduction amount p of the threshold value th1 may be equal to each other. Preferably, the reduction amount p of the threshold value th1 is determined in consideration of a parameter setting of the threshold-value matrix MTX1*a*. Also, the input density value c0 specifying the threshold value b corresponding to a gap size may be set to have a value different from the reduction amount p of the threshold value, which is determined according to the threshold value b corresponding to a gap size.

In terms of gap according to the threshold value b corresponding to the gap size, a density value c0 specifying the threshold value b corresponding to the gap size needs to make dots, which are inside a halftone dot and are less than the threshold value b, be non-output dots.

Specifically, first, when the threshold value th1 of the first threshold-value matrix MTX1a is less than the input density value c0 specifying the threshold value b corresponding to a gap size, the threshold-value conversion section 250 sets a corrected threshold value th6 to a maximum value thmax among the threshold values th1 constituting the first threshold-value matrix MTX1, so as to generate gaps (S40—YES, S42). That is, the threshold-value conversion section 250 corrects threshold value data relating to a gap portion so as to form gap dots.

Furthermore, when the threshold value th1 of the first threshold-value matrix MTX1a is equal to or larger than the input density value c0 specifying the threshold value b corresponding to a gap size, the threshold-value conversion section 250 sets a value, which is obtained by subtracting the reduction amount p (in this embodiment, the reduction amount p is equal to the input density value c0 specifying the threshold value b corresponding to a gap size) corresponding to the input density value c0 specifying the threshold value b corresponding to a gap size from the original threshold value th1, to the corrected threshold value th6 (S40—NO, S44). Such a conversion processing can be represented by the following equation (1).

[Equation 1]

$$\left. \begin{array}{l} th < c0 : th6 = th\ \max \quad (1-1) \\ th \geq c0 : th6 = th1 - p(p = c0) \quad (1-2) \end{array} \right\} \quad (1)$$

The fourth comparing section 24 compares the multilevel-image data DMV and the converted threshold value th6 to then generate the binarization recording signal Dout for forming a halftone dot, which includes gap having a size corresponding to the density of an input image, having a size corresponding to the density of the input image (S48).

According to the threshold-value conversion process of the second embodiment, the threshold values at outer sides of the gap dots are uniformly reduced by the reduction amount p (=c0), which makes it possible to generate gap through a process of forming gap inside a contour of a halftone dot. In this case, output dots (black dots) may be easily enlarged toward the outside of the contour of halftone dot. Therefore, corresponding to the number of gap dots formed by the binarization process performed by the fourth comparing section 24, the black dots can be corrected to be added to the outside of the halftone dot.

Figure 10A:
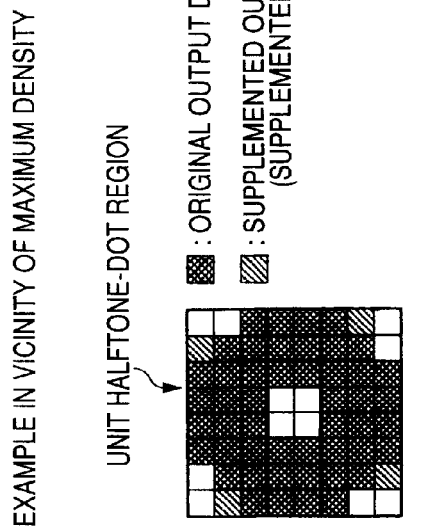
FIG. 10 is a diagram showing an example of an output of halftone dots when an image recording process is performed according to the halftone-dot processing procedure performed by the binarization processing section of the second embodiment.
Figure 10C:
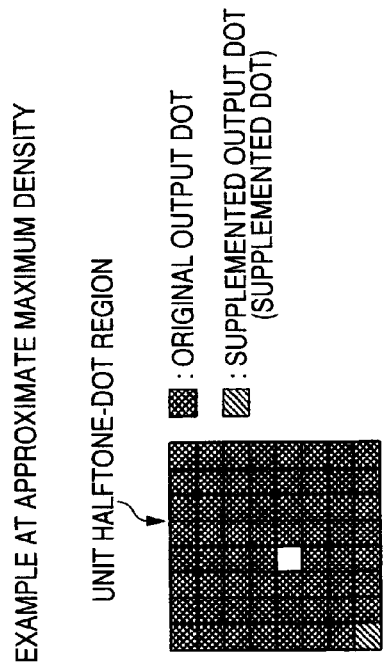
Figure 10B:
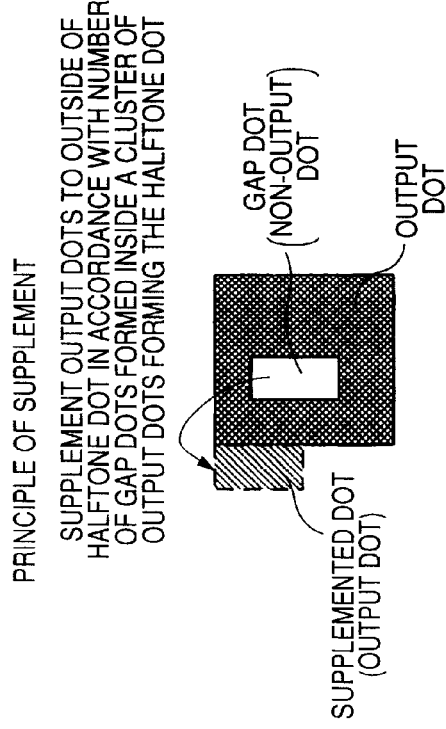
Figure 10D:

For example, as can be seen from a diagram illustrating a principle in FIG. 10(A), if gap is generated by a process of forming the gap inside the outline of halftone dot, the output dots (black dots) are easily enlarged toward the outside of the contour of halftone dot. As shown in FIG. 10(B), it is possible to supplement output dots, number of which corresponds to number of the gap dots, to outside of the contour of the halftone dot in a unit halftone-dot region, when a density of an input image is in a range of a low density to the vicinity of the maximum density Cmax. Further, as shown in FIG. 10(C), since non-output dots exist at an outermost portion of the unit halftone-dot region even though a density of the input image is in the vicinity of the maximum density Cmax, it is possible to supplement output dots, number of which corresponds to the number of gap dots, to the outside of the contour of the halftone dot. Moreover, as shown in FIG. 10(D), when a density of the input image is approximately equal to a maximum density Cmax, one non-output dot exists at the outermost portion of the unit halftone-dot region. Accordingly, if one gap dot is formed there, it is possible to supplement output dot, number of which corresponds to the number of the gap dots, to the outer side of the halftone dot outline.

Conversely, when the growth state of the output dots constituting the halftone dot according to the density of an input image and the gap size corresponding to the density of the input image are not appropriately set up, the number of non-output dots remaining at the outside of the halftone dot is not sufficient, and therefore, there occurs a case in which complete correction can not be performed. In the second embodiment, in order to make the gap size appropriate from the above-mentioned point of view, a process of arranging white dots (non-output dots) inside a halftone dot in FIG. 6 may not be performed in the entire range from the densities C1 and C3 giving the gap formation starting point on the low-density side to the maximum density Cmax, but be performed only in an intermediate density range (from C1 to C2 or from C3 to C4).

As a result, an area ratio of black dots on an electronic image is almost maintained. In other words, it is possible to suppress an area ratio of on/off pixels varying due to gap generation from changing. In addition, when trying to maintain an image quality or reduce the amount of toner consumption by forming gaps inside the halftone dots, it is possible to keep the area coverage of the output image, and to prevent abnormal density change (tone jump) from occurring.

Further, it is possible to omit a plurality of binarization processing sections and a section for synthesizing a binary image, so that a gap-type halftone-dot image can be efficiently generated. Furthermore, the profile is corrected in one processing apparatus, a gap-type halftone-dot image having different characteristics can be easily generated.

Configuration of Binarization Processing Section

Third Embodiment

Figure 11:
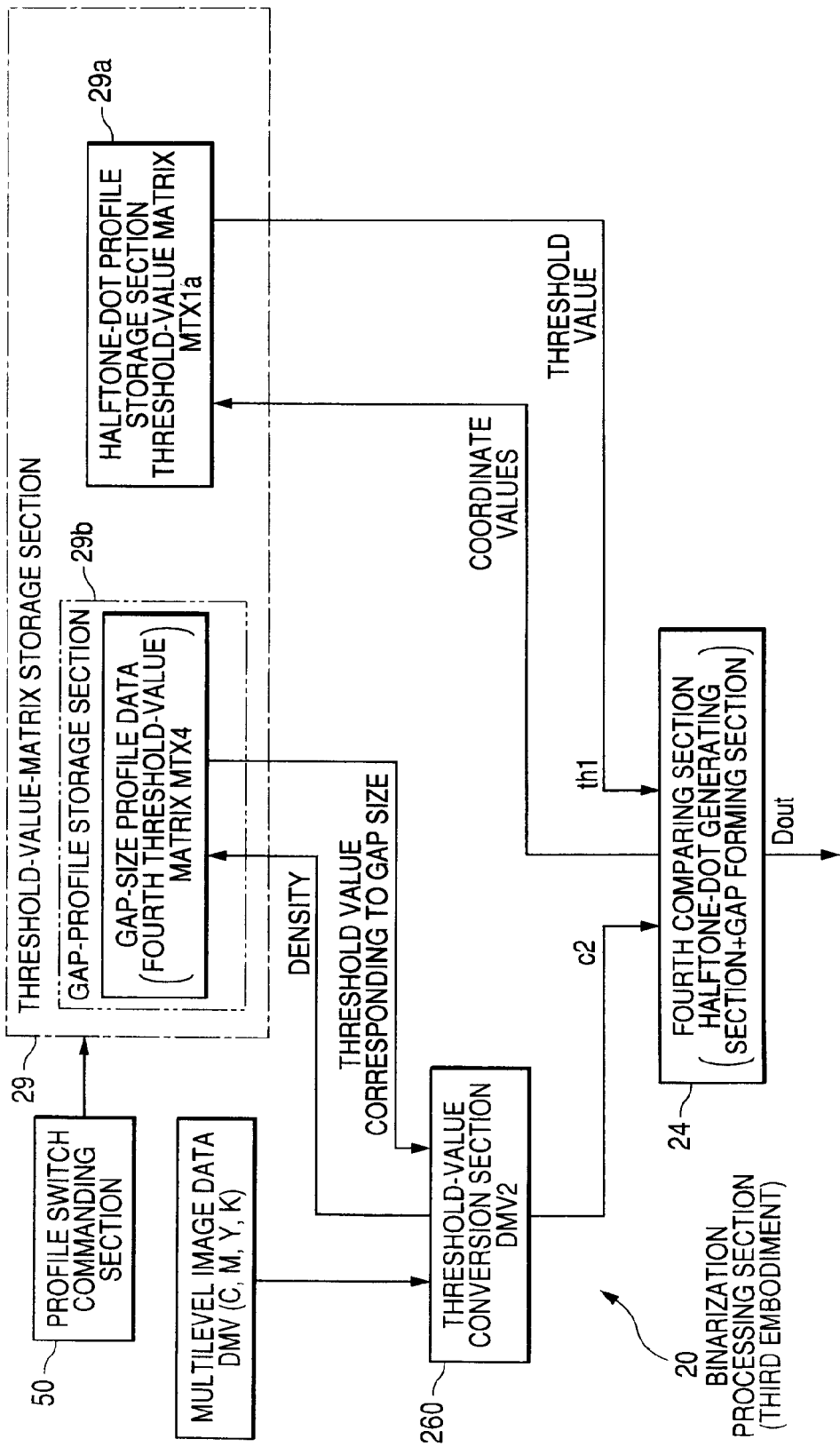
FIG. 11 is a diagram illustrating a configuration of a binarization processing section according to a third embodiment.

FIG. 11 is a diagram illustrating a configuration of the binarization processing section 20 (binarization processing section 20 of a third embodiment) used in an image forming apparatus 1 according to the third embodiment. The binarization processing section 20 of the third embodiment has a feature that it adjusts the density value of an input image in advance so that number of gap dots is corrected on the basis of the gap size, and the input image whose density has been adjusted is used in a comparing process performed by the fourth comparing section 24.

Specifically, in the binarization processing section 20 of the third embodiment, a halftone-dot profile storage section 29a stores a modified pattern (referred to as threshold-value matrix MTX1a) of the first threshold-value matrix MTX1 for outputting a dot pattern similar to the conventional halftone dot growth.

Further, the binarization processing section 20 according to the third embodiment includes a density-value conversion section 260 and the fourth comparing section 24. The density-value conversion section 260 converts input multilevel-image data DMV by referring to a gap size stored in a gap-profile storage section 29b to thereby generate multilevel-image data DMV2. The fourth comparing section 24 performs a binarization process with using a result of the conversion performed by the density-value conversion section 260. The density-value conversion section 260 supplies the multilevel-image data DMV2, which has been converted, to the fourth comparing section 24 having functions of a halftone dot generating section and a gap generating section.

The density-value conversion section 260 has a function of a gap-dot correcting section, which supplements output dots to a halftone dot in order to compensate for generated gaps. In particular, the density-value conversion section 260 has a function of a signal-intensity modifying section, which modifies the signal intensity of an image to be processed so that non-output dots are formed, by referring to a gap size corresponding to the signal intensity of the image to be processed (multilevel-image data DMV representing the density of an input image) in gap size profile data stored in the gap-profile storage section 29b. In the present embodiment, the density-value conversion section 260 has both functions of the gap-dot correcting section and the signal-intensity modifying section.

Here, the density-value conversion section 260 determines the increasing amount of density according to the gap size at a time of performing a density conversion process, and performs the density conversion process according to the increasing amount, which has been determined so that the density in a portion other than gaps increases. Thereby, as detailed later, the third embodiment can supplement black dots number of which corresponds to number of gap dots formed in a portion of the halftone dot (in this embodiment, inside the halftone dot) to the contour portion of the halftone dot as in the threshold-value conversion process performed by the threshold-value conversion section 250 in the second embodiment.

Halftone-Dot Processing Procedure

Third Embodiment

Figure 12:
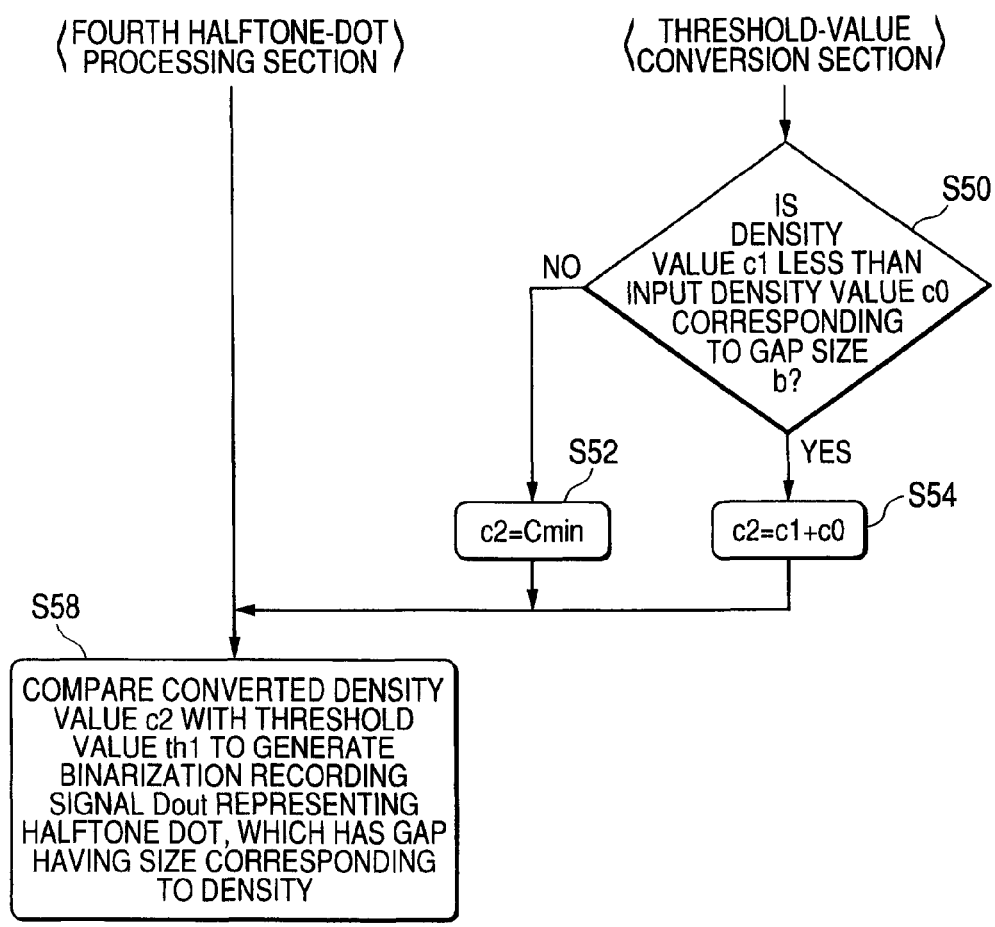
FIG. 12 is a flow chart illustrating an outline of a halftone-dot processing procedure by the binarization processing section of the third embodiment.

FIG. 12 is a flow chart illustrating an outline of a procedure of the binarization process (specifically, a halftone dot process) performed by the binarization processing section 20 of the third embodiment.

The density-value conversion section 260 compares the multilevel-image data DMV input from the color-separation-signal generating section 10 with the gap size profile data read out from the gap-profile storage section 29b to generate multilevel-image data DMV2. Then, the density-value conversion section 260 transmits the obtained multilevel-image data DMV2 to the fourth comparing section 24.

Here, an input density value c0 specifying a threshold value b corresponding to a gap size corresponds to an increasing amount q of a density value. The increasing amount q is determined according to the threshold value b corresponding to a gap size. When number of gray-scale levels of the density of the multilevel-image data DMV is equal to number of threshold value steps (it is necessary that the unit halftone-dot region has dots number of which is equal to the number of gradation-scale levels of the density) of a threshold-value matrix MTX1a, the input density value c0 and the increasing amount q of the density value may be equal to each other. Preferably, the increasing amount q of the density value is determined in consideration of a parameter setting of the threshold-value matrix MTX1a. Also, the input density value c0 specifying the threshold value b corresponding to a gap size may be set to have a value different from the increasing amount q of a density value, which is determined according to the threshold value b corresponding to a gap size.

Specifically, first, when the input density value c1 is greater than the input density value c0 specifying the threshold value b corresponding to a gap size, the density-value conversion section 260 sets a density value c2 of the multilevel-image data DMV2 to a minimum density value Cmin ($\approx 0$) in order to generate gap dots (S50—NO, S52). In addition, when the input density value c1 is less than the input density value c0 specifying the threshold value b corresponding to a gap size, the density-value conversion section 260 sets a value, which is obtained by adding the increasing amount q (a value equal to the threshold value b corresponding to a gap size in the present embodiment) corresponding to the gap size to the original density value c1, to the density value c2 of the multilevel-image data DMV2 (S50—YES, S54). Such a conversion process can be represented as a following equation.

$$\left. \begin{array}{ll} c1 > c0 : c2 = Cmin & (2-1) \\ c1 \leq c0 : c2 = c1 + g(g = c0) & (2-2) \end{array} \right\} \quad (2)$$

The fourth comparing section 24 compares the density value c2 of the converted multilevel-image data DMV with a threshold value th1 read out from the halftone-dot profile storage section 29a to generate the binarization recording signal Dout for forming a halftone dot, which has gap having a size corresponding to the density of the input image and has a size corresponding to the density of the input image (S58).

According to the density value conversion process of the third embodiment, the density values of dots outside the gap dots increase uniformly by the increasing amount q (=c0), which makes it possible to generate gap dots through a process of forming gap inside a contour of the halftone dot. However, in this case, output dots (black dots) may be easily enlarged toward the outside of the contour of the halftone dot.

Accordingly, in the third embodiment, the black dots can be corrected to be attached to the outside of the halftone dot in response to the number of gap dots formed by the binarization process performed by the fourth comparing section 24. As a result, it is possible to suppress the area ratio of on/off pixels, which vary due to the gap generation, from changing.

Further, similar to the second embodiment, in order to appropriately set gap size corresponding to the original growth state of a halftone dot and the gap size, it is preferable that white dots (non-output dots) be arranged inside the halftone dot only in a middle density region (in a range of from C1 to C2 or from C3 to C4).

Furthermore, similar to the second embodiment, it is possible to omit a plurality of binarization processing sections and a section for synthesizing a binary image, so that a gap-type halftone-dot image can be efficiently generated. In addition, by modifying the profile in one processing apparatus, gap-type halftone-dot images having different characteristics can be easily generated.

Configuration of Binarization Processing Section

Fourth Embodiment

Figure 13:
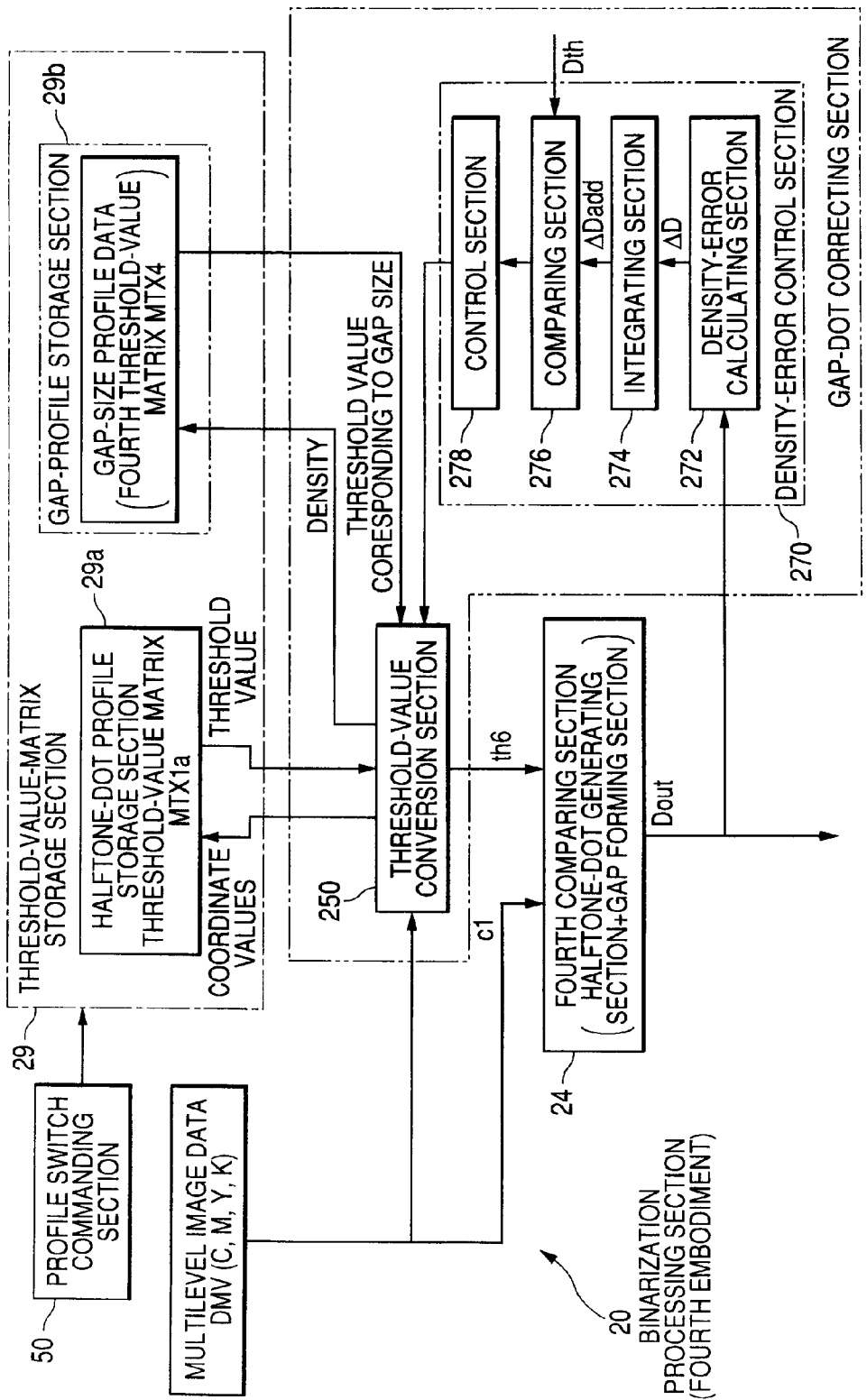
FIG. 13 is a diagram illustrating a configuration of a binarization processing section according to a fourth embodiment.

FIG. 13 is a diagram illustrating a configuration of the binarization processing section 20 (binarization processing section 20 of a fourth embodiment) used in an image forming apparatus 1 according to the fourth embodiment. The binarization processing section 20 of the fourth embodiment has a feature that it calculates an integrated value of density errors in an output image caused by forming the gap dots. The binarization processing section 20 controls the gap formation so that a result of the calculation is less than a predetermined threshold value. More specifically, the binarization processing section 20 of the fourth embodiment integrates the density errors in the output image, which occurs due to output dots, which are reduced by forming gap dots inside the halftone dots. The binarization processing section 20 stops forming the gap dots inside the halftone dot when the integrated value exceeds the predetermined threshold value. Then, the binarization processing section 20 performs forming the gap dots inside the halftone dot until the integrated value of the density errors exceeds the predetermined threshold value again.

The second and third embodiments supplement output dots outside the halftone dot whenever gap dots are formed inside the halftone dot. The fourth embodiment is different from the second and third embodiments in that the output dots are supplemented by stopping forming the gap dots at a time when the integrated value of the density errors caused by forming the gap dots exceeds a predetermined amount (threshold value).

Here, the fourth embodiment will be described as a modification of the second embodiment. In the binarization processing section 20 of the fourth embodiment, first, the threshold-value conversion section 250 performs only a process according to the equation (1-1) representing the threshold value conversion for the gap formation, among the threshold-value conversion processes of the second embodiment, but does not perform a process according to the equation (1-2) representing the threshold value conversion to compensate for the gap dots.

Further, the binarization processing section 20 of the fourth embodiment includes a density-error control section 270 as well as the configuration of the second embodiment. The density error control section 270 monitors the result of the binarization process performed by the fourth comparing section 24, specifically, the density errors in the output image. The density errors occur due to reduction of the output dots inside the halftone dot. The density error control section 270 controls a threshold-value conversion process in the threshold-value conversion section 250 so that the integrated value of density errors is in a predetermined range. The threshold-value conversion section 250 and the density-error control section 270 constitute a gap-dot correcting section for supplementing output dots to the halftone dot to compensate for the generated gap dots.

Also, when the threshold value th1 of the first threshold-value matrix MTX1 is equal to or larger than the input density value c0 specifying the threshold value b corresponding to the gap size, a value obtained by decreasing the original threshold value th1 by the reduction amount p corresponding to the input density value c0 specifying the threshold value b corresponding to the gap size (in this example, the same value as the input density value c0 specifying the threshold value b corresponding to the gap size) is set as the threshold value th6 after corrected (S40-NO, S44). Such a threshold value conversion processing can be expressed by the following equation (1).

The density-error control section 270 includes a density-error calculating section 272, an integrating section 274, a comparing section 276 and a control section 278. The density-error calculating section 272 calculates a density error ΔD in the output image occurring due to output dots, which are reduced by forming gap dots inside a halftone dot. The integrating section 274 integrates the density error ΔD calculated by the density-error calculating section 272.

The density error occurs whenever gap dots are formed inside the halftone dot. Therefore, the density-error calculating section 272 counts number of gap dots generated inside each halftone dot, for example, and then sets the counted value to the density error ΔD.

In addition, The comparing section 276 compares the integrated value (accumulated value) ΔDadd of density errors integrated by the integrating section 274 with a predetermined threshold value Dth. The controlling section 278 controls the threshold-value conversion section 250 so as to stop forming the gap dots inside the halftone dot when the integrated value ΔDadd exceeds the predetermined threshold value ΔDth. Then, the control section 278 allows to form the gap dots inside the halftone dot until the integrated value ΔDadd of the density errors exceeds the predetermined threshold value ΔDth again.

When the threshold-value conversion section 250 receives a conversion-process stop instruction, the threshold-value conversion section 250 stops the threshold-value conversion process described in the second embodiment until it receives a conversion-process restart instruction. Accordingly, the fourth comparing section 24 may generate the binarization recording signal Dout representing halftone dot without gap dots therein during a period of time for which the conversion process is stopped, similarly to the conventional binarization process. That is, the binarization processing section 20 converts non-output dots for gap formation into output dots when the integrated value ΔDadd of the density errors exceeds the threshold value ΔDth.

Further, the configuration of the fourth embodiment may be combined with the configuration of the third embodiment. In this case, the density-value conversion section 260 performs only a process according to the equation (2-1) representing the density value conversion for the gap formation, among the density value conversion processes of the third embodiment, but does not perform a process according to the equation (2-2) representing the density value conversion to compensate for the gap dots.

Halftone-Dot Processing Procedure

Fourth Embodiment

Figure 14:
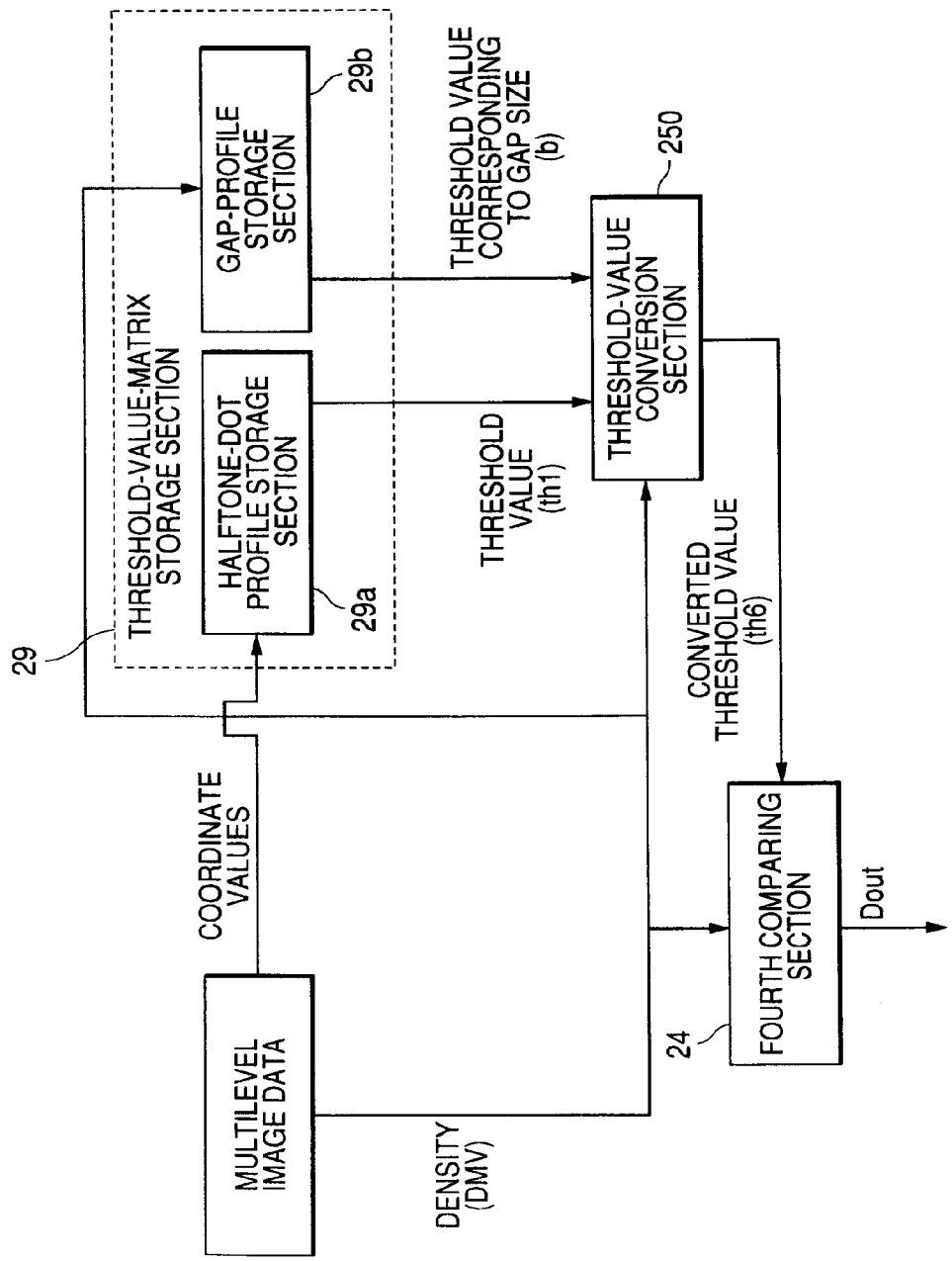
FIG. 14 is a flow chart illustrating an outline of a halftone-dot processing procedure by the binarization processing section of the fourth embodiment.

FIG. 14 is a flow chart illustrating an outline of a procedure of the binarization process (specifically, a halftone dot process) performed by the binarization processing section 20 of the fourth embodiment.

First, when the threshold-value conversion section 250 receives the density DMV from the multi-level image, and the threshold value th1 and a gap size c0 from the threshold-value matrix memory 29, if the threshold value th1 of the first threshold-value matrix MTX1$a$ is less than the input density value c0 specifying the threshold value b corresponding to the gap size, the threshold-value conversion section 250 sets the corrected threshold value th6 to a maximum value thmax among the threshold values th1 constituting the first threshold-value matrix MTX1$a$ in order to generate gap dots.

If the threshold value th1 of the first threshold-value matrix MTX1$a$ is equal to the input density value c0 specifying the threshold value b corresponding to the gap size, the threshold-value conversion section 250 adds DMV to the integrated value (accumulated value) ΔDadd of density errors, and stops generating gaps when the integrated value ΔDadd exceeds the threshold value Dth, and then subtracts Dmax from Dth. If the threshold value th1 of the first threshold-value matrix MTX1$a$ is larger than the input density value c0 specifying the threshold value b corresponding to the gap size, the threshold-value conversion section 250 sets the original threshold value th1 to the corrected threshold value th6. Such a threshold-value conversion process can be represented by the following equation. The following equation represents that an error diffusion method is used in a boundary between gap dots and output dots.

$$th1 < c0 : th6 = th\max$$

$$th1 = c0 : \Delta Dadd = \Delta Dadd + DMV$$

if ($\Delta Dadd > Dth$)

$$Y : th6 = th\min, \Delta Dadd = \Delta Dadd - D\max$$

$N$:(not processed)

$$th1 > c0 : th6 = th1 \quad (3)$$

The fourth comparing section 24 compares the density value c2 of the converted multilevel-image data DMV2 and the threshold value th6 read out from the halftone-dot profile storage section 29a to generate the binarization recording signal Dout for forming a halftone dot, which has gap having a size corresponding to the density of an input image and has a size corresponding to the density of the input image.

In parallel, the threshold-value conversion section 250 determines if a given pixel is a gap dot, an output dot, or a boundary therebetween. If it is determined that the given pixel is a boundary, an on/off of the given pixel dot is determined by the error diffusion process. Here, the reason why the error diffusion process is used only in a boundary portion of gap is to prevent an isolated dot from being generated inside the gap.

Figure 15:
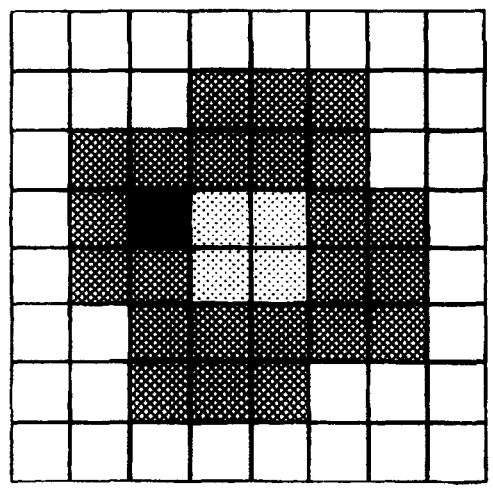
FIG. 15 is a diagram illustrating classification of an output dot, a gap, and a boundary.

FIG. 15 is a diagram illustrating an output dot, a gap, and a boundary portion, respectively.

Figure 16:
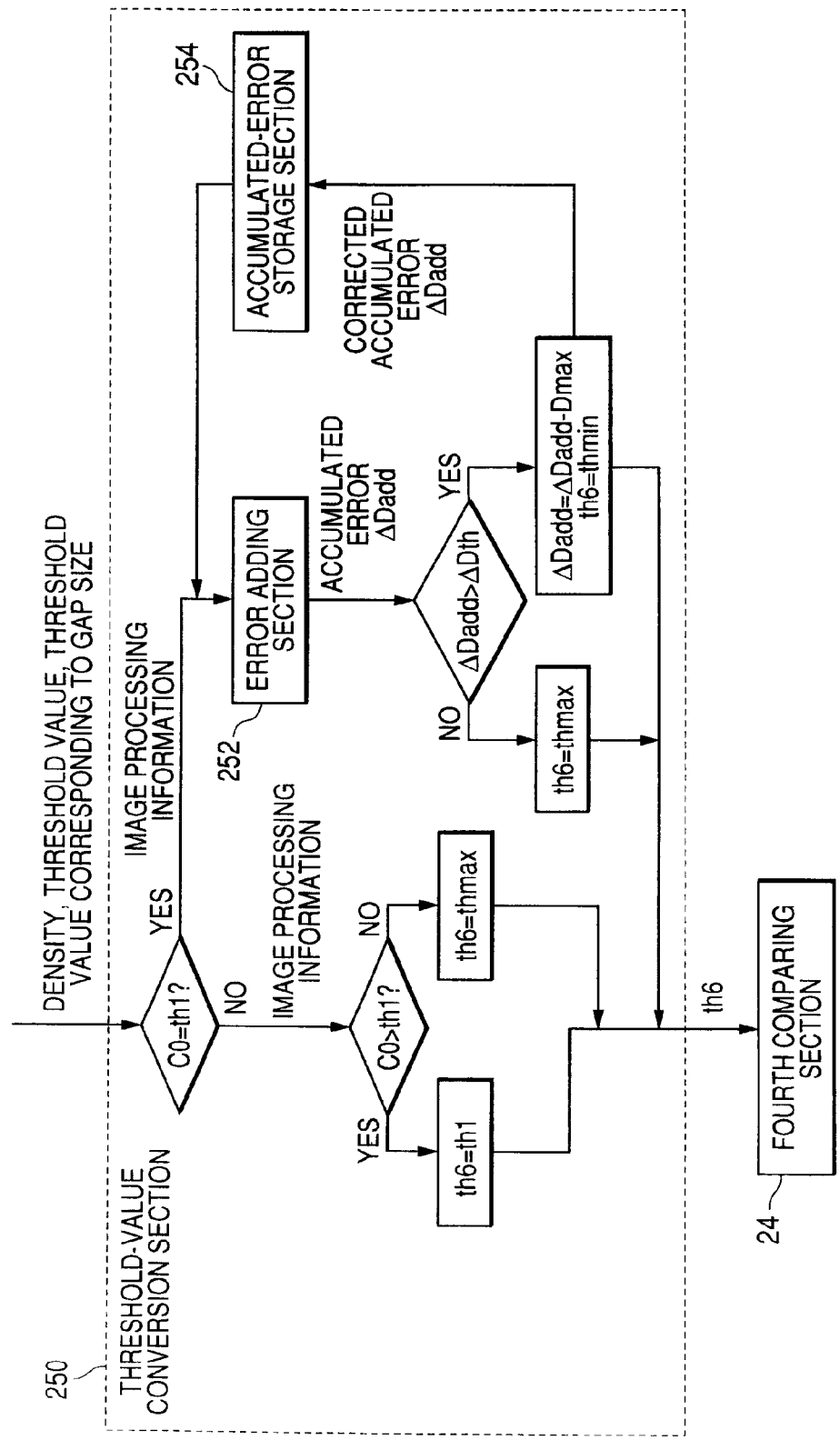
FIG. 16 is a flow chart illustrating an outline of a threshold-value conversion process order by a threshold-value conversion section.

FIG. 16 is a flow chart illustrating an outline of a threshold-value conversion process order in the threshold-value conversion section 250. Here, a detailed configuration example of the threshold-value conversion section 250 is shown as well, and the threshold-value conversion section 250 includes an error adding section 252, which accumulates density errors of input images, and an accumulated-error storage section 254, which accumulates corrected accumulated errors.

If it is determined that the given pixel is not the boundary (c0≠th1), the above described gap generation processing is performed. If it is determined that the given pixel is the boundary (c0=th1), the error adding section 252 further adds the density of the input image as an error to the accumulated error ΔDadd, which has been corrected and is accumulated in the accumulated-error storage section 254. If the accumulated error ΔDadd by the error adding section 252 exceeds the threshold value Dth, th6 is made to be a minimum value and the accumulated error ΔDadd is corrected. If the accumulated error ΔDadd does not exceed the threshold value Dth, th6 is made to be a maximum value. The corrected ΔDadd is stored in the accumulated-error storage section.

Figure 17A:
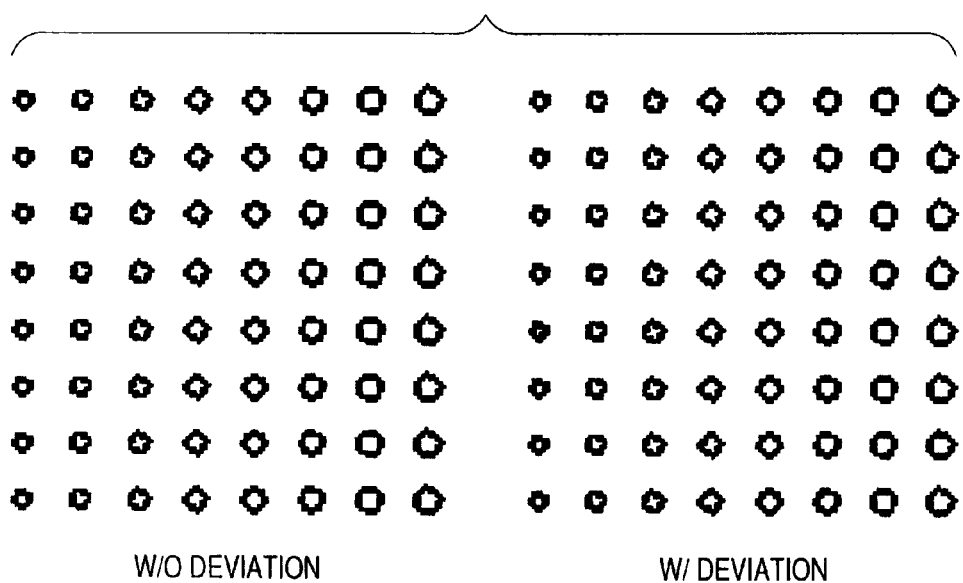
FIG. 17 is a diagram illustrating an example of a binary image when there is deviation in a gap size and one an example of a binary image when there is no deviation in the gap size.
Figure 17B:
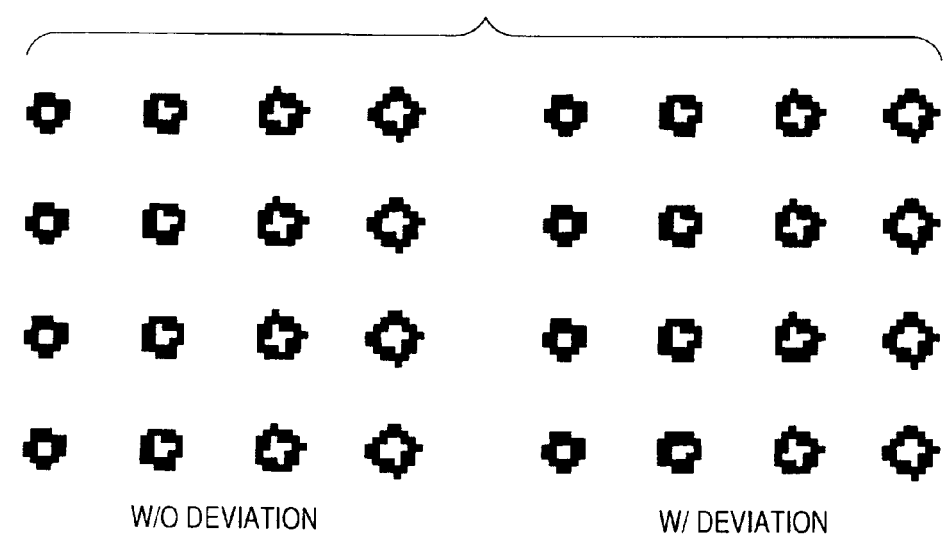

FIGS. 17(A) and 17(B) are diagrams illustrating an example of a binary image when there is deviation in a gap size and an example of a binary image when there is no deviation in the gap size. FIG. 17(B) is a partially enlarged view of FIG. 17(A). If halftone dots are formed without deviation in the gap size, halftone dot structures change all together. Accordingly, a pseudo outline is easily generated. On the other hand, if the halftone dots are formed with deviation in the gap size, slightly different halftone dot structures are formed, so that it is difficult to notice the transition point of the density. That is, the pseudo outline is difficult to be generated.

Moreover, the above-described method according to the fourth embodiment may be employed to solve a problem, which may occur in a case where the configurations of the second and third embodiments are employed. Specifically, when an integrated value of number of output dots, which have not been supplemented to the outside of a halftone dot in a case where a gap size is not equal to a growth size of a halftone dot toward the outside thereof, exceeds a threshold value, non-output dots (gap dots) inside the halftone dot are converted into output dots number of which corresponds to the integrated value. Thereby, it is possible to suppress change in the area ratio of on/off pixels, which varies due to the gap generation. non-output (gap) dots, corresponding to the number of output dots at the outside of the halftone dots which could not be supplemented, inside the halftone dots is converted into output dots when the integrated value exceeds a threshold value, and accordingly, it is possible to suppress the area ratio of on/off pixels varying by gap generation from changing.

Configuration of Binarization Processing Section

Fifth Embodiment

Figure 18:
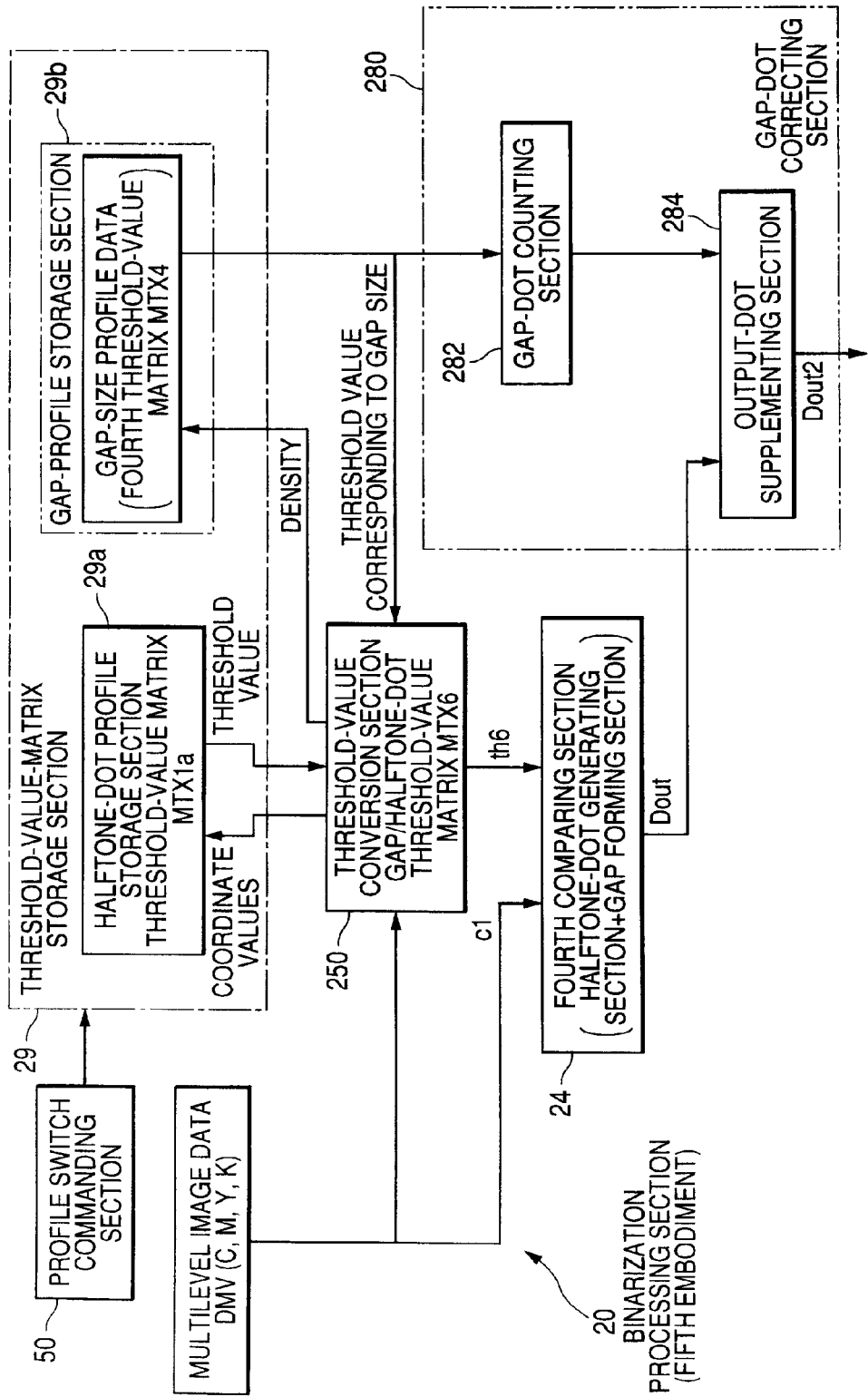
FIG. 18 is a diagram illustrating a configuration of a binarization processing section according to a fifth embodiment.
Figure 19:
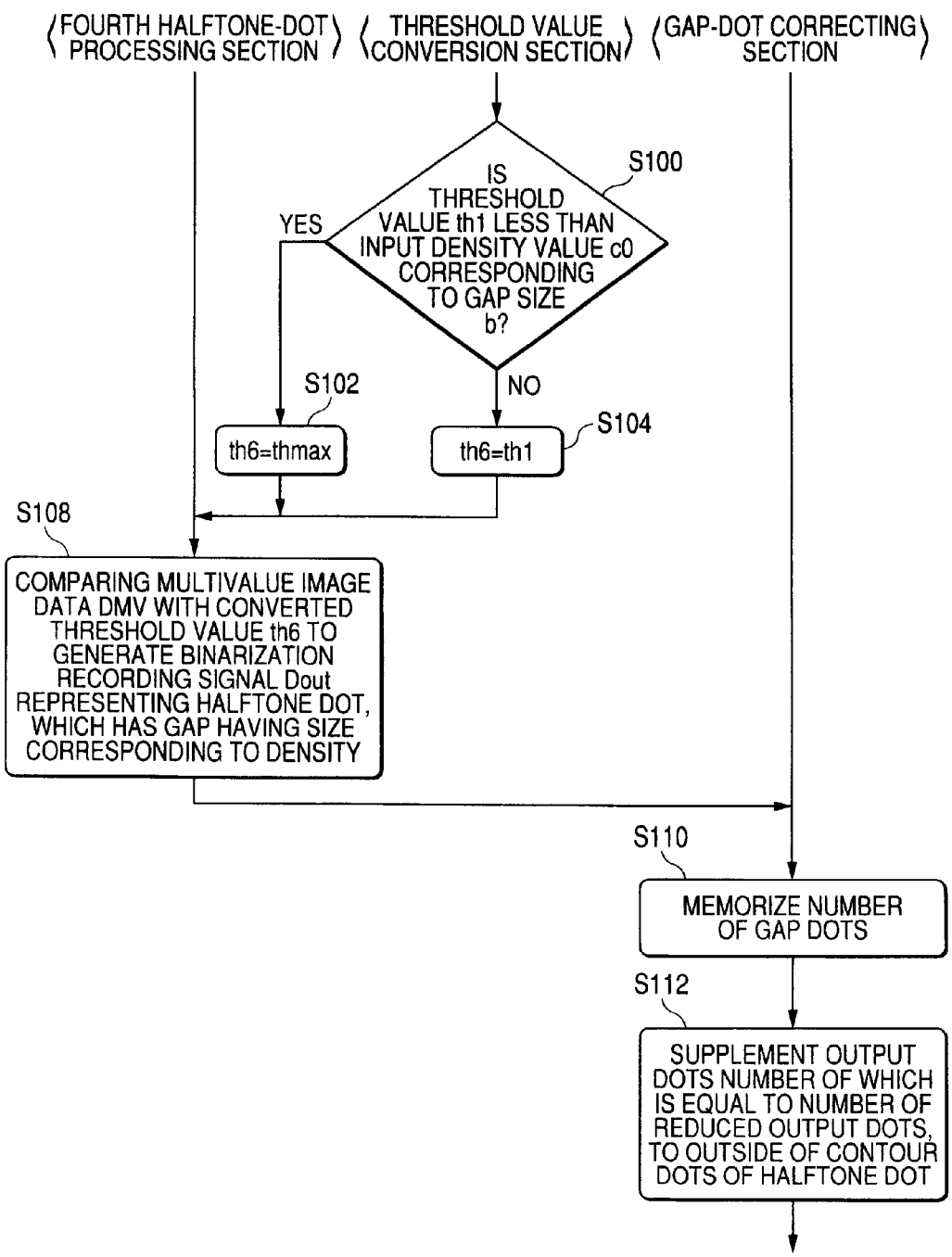
FIG. 19 is a flow chart illustrating an outline of a halftone-dot processing procedure by the binarization processing section of the fifth embodiment.

FIG. 18 is a diagram illustrating a configuration of the binarization processing section 20 (binarization processing section 20 of a fifth embodiment) used in an image forming apparatus 1 according to the fifth embodiment. In addition, FIG. 19 is a flow chart illustrating an outline of a procedure of a binarization process (specifically, a halftone dot process) performed by the binarization processing section 20 of the fifth embodiment.

The binarization processing section 20 of the fifth embodiment has a feature that output dots, number of which is equal to number of gap dots formed inside the halftone dot, are supplemented to the outside of the halftone dot. Similarly to the second and third embodiments, whenever gap is formed inside a halftone dot, output dots are supplemented to the outside of the halftone dot in the fifth embodiment. The fifth embodiment is different from the second and third embodiments in that the output dots, number of which is equal to number of the gap dots inside the halftone dot, are supplemented to the outside of the halftone dot.

Here, the fifth embodiment will be described as a modification of the configuration of the second embodiment. In the binarization processing section 20 of the fifth embodiment, first, the threshold-value conversion section 250 performs only a process according to the equation (1-1) representing the threshold value conversion for the gap formation, among the threshold-value conversion processes of the second embodiment, but does not perform a process according to the equation (1-2) representing the threshold value conversion to compensate for the gap dots.

Specifically, as shown in equation 3, when the threshold value th1 of the first threshold-value matrix MTX1a is less than the input density value c0 specifying the threshold value b corresponding to a gap size, the threshold-value conversion section 250 sets the corrected threshold value th6 to a maximum value thmax among the threshold values th1 constituting the first threshold-value matrix MTX1a in order to generate gaps (S100—YES, S102). When the threshold value th1 of the first threshold-value matrix MTX1 is larger than the input density value c0 specifying the threshold value b corresponding to a gap size, the threshold-value conversion section 250 sets an original threshold value th1 to the corrected threshold value th6 (S100—NO, S104).

The fourth comparing section 24 compares the multilevel-image data DMV with the converted threshold value th6 to generate the binarization recording signal Dout representing a halftone dot, which has gap having a size corresponding to the density of an input image and has a size corresponding to the density of the input image (S108).

Further, the binarization processing section 20 of the fifth embodiment includes a gap-dot correcting section 280 having a gap-dot counting section 282 and an output-dot supplementing section 284 as well as the configuration of the second embodiment.

The gap-dot counting section 282 memorizes the number of reduced output dots inside the halftone dot, that is, the number of gap dots (S110). On the basis of the counting result of the gap-dot counting section 282, the output-dot supplementing section 284 adds outputs dot, number of which is equal to number of the reduced output dots, to a portion other than the gap portion (specifically, to the outside of the contour dots of the halftone dot) in the binarization recording signal Dout, which is a result of an output of the fourth comparing section 24. As a result, the output-dot supplementing section 284 generates a binarization recording signal Dout2, which represents a halftone-dot image having the output dots supplemented to the outside of the halftone dot in accordance with the gap size (S114).

In addition, the configuration of the fifth embodiment may be combined with the configuration of the third embodiment. In this case, the density-value conversion section 260 performs only a process according to the equation (2-1) representing the density value conversion for the gap formation, among the density value conversion processes of the third embodiment, but does not perform a process according to the equation (2-2) representing the density value conversion to compensate for the gap dots.

According to the halftone dot process of the fifth embodiment, it is possible to supplement black dots, number of which is equal to that of gap dots formed at a halftone-dot portion (inside the halftone dot in the present embodiment), to the contour portion of the halftone dot. Also, it is possible to make the number of the black dots to be equal to the number of gap dots surely. Thereby, even when a unit halftone-dot region coincides with a position where the density of the input image changes significantly, the gap size and the growth size of the halftone dots toward the outside thereof can be reliably made to be equal to each other. Also, in combination with the gap-size variable system, it is possible to suppress the area ratio of on/off pixels varying by gap generation from changing, while reliably preventing a phenomenon that a pseudo outline is generated at a position where gaps are generated.

Configuration of Binarization Processing Section

Sixth Embodiment

Figure 20:
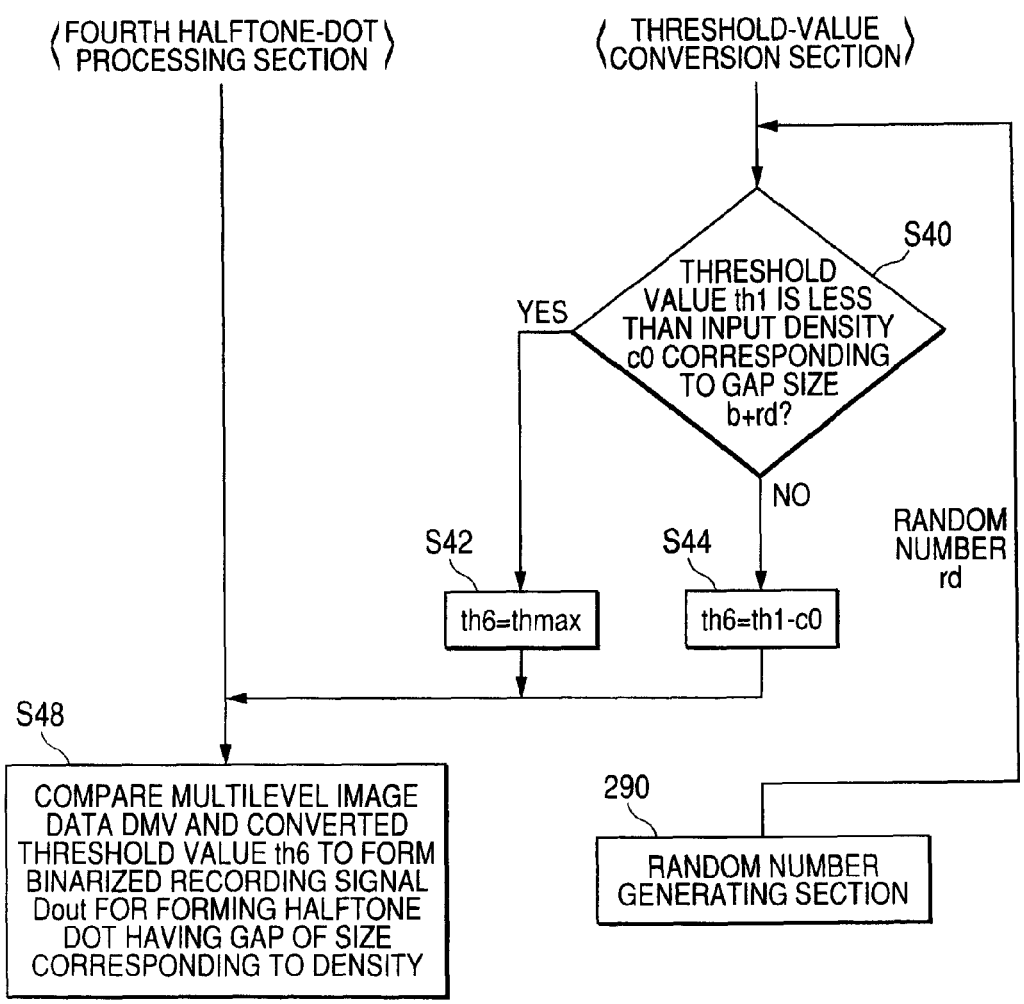
FIG. 20 is a flow chart illustrating an outline of a halftone-dot processing procedure used in an image forming apparatus according to a sixth embodiment.

FIG. 20 is a flow chart illustrating an outline of a halftone-dot processing procedure used in an image forming apparatus 1 according to a sixth embodiment.

Specifically, a threshold-value conversion section 250, at first, acquires random number rd generated by a random-number generating section 290. If the threshold value th1 of the first threshold-value matrix MTX1 is smaller (less) than a sum of the threshold value b corresponding to the gap size and the random number rd, the corrected threshold value th6 is set to the maximum value thmax among the respective threshold values th1 constituting the first threshold-value matrix MTX1 (S40-YES, S42). That is, threshold value data relating to a gap portion is corrected so as to form gap dots.

If the threshold value th1 of the first threshold-value matrix MTX1 is equal to or larger than the sum of the threshold value b corresponding to the gap size and the random number rd, a value, which is obtained by subtracting the reduction amount p (in this embodiment, the reduction amount p is equal to the input density value c0 specifying the threshold value b corresponding to a gap size) corresponding to the threshold value b corresponding to the gap size from the original threshold value th1, is set to the corrected threshold value th6 (S40—NO, S44). Such a conversion processing can be represented by the following equation (4).

[Equation 4]

$$\left. \begin{array}{ll} th < c0 + rd : th6 = th\max & (4-1) \\ th \geq c0 + rd : th6 = th1 - p & (4-2) \end{array} \right\} \quad (4)$$

According to the halftone-dot processing of the sixth embodiment, the gap size can be distributed in a desired range. Thereby, noise, which is added for preventing a pseudo outline from occurring, can be suppressed to the minimum necessary.

Configuration of Binarization Processing Section

Seventh Embodiment

Figure 21:
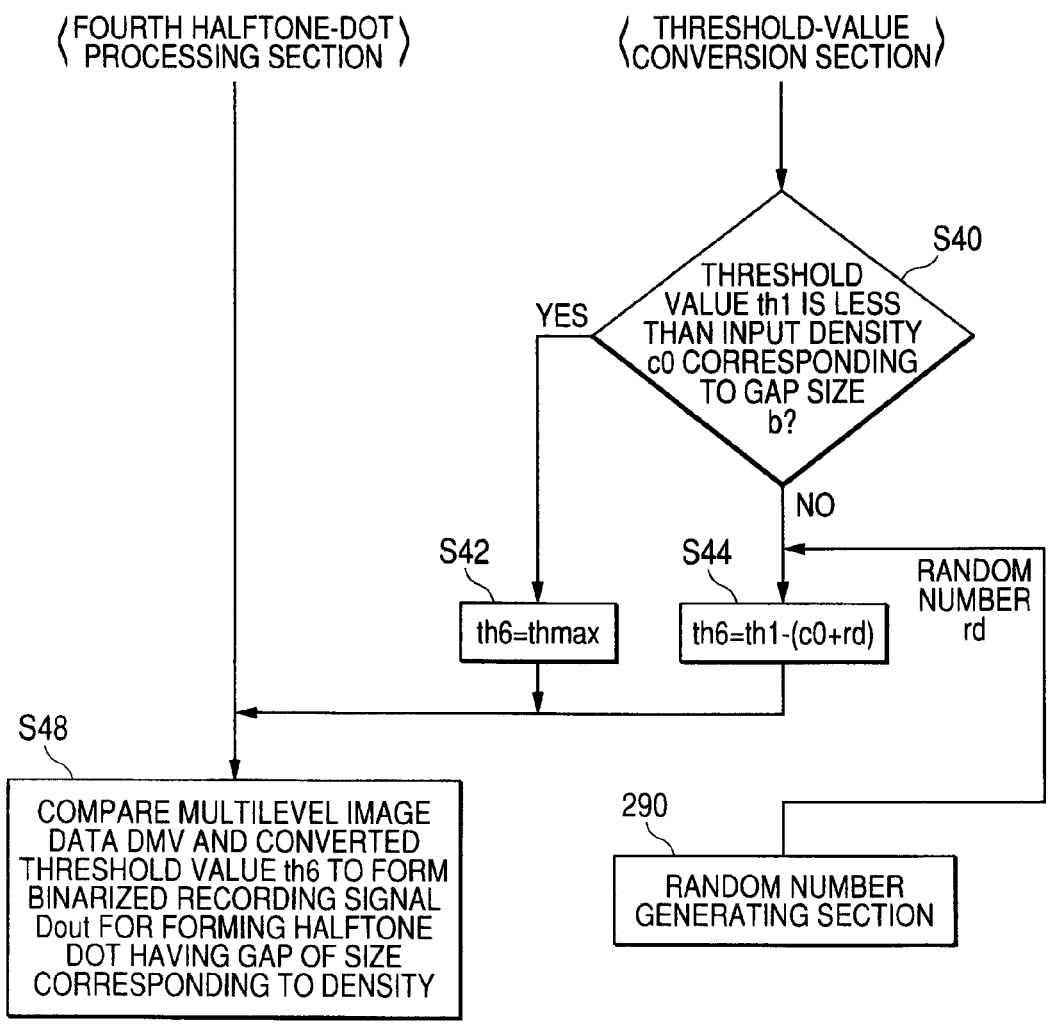
FIG. 21 is a diagram illustrating a configuration of a binarization processing section 20 used in an image forming apparatus according to a seventh embodiment.

FIG. 21 is a diagram illustrating a configuration of a binarization processing section 20 (the binarization process section 20 of the sixth embodiment) used in an image forming apparatus 1 according to a seventh embodiment.

Specifically, if the threshold value th1 of the first threshold-value matrix MTX1 is smaller (less) than the threshold value b corresponding to the gap size specifying the input density value c0, a threshold-value conversion section 250, at first, sets the corrected threshold value th6 to the maximum value thmax among the respective threshold values th1 constituting the first threshold-value matrix MTX1 in order to generate the gap (S40-YES, S42). That is, threshold value data relating to a gap portion is corrected so as to form gap dots.

Also, if the threshold value th1 of the first threshold-value matrix MTX1 is equal to or larger than the threshold value b corresponding to the gap size specifying the input density value c0, a value, which is obtained by subtracting the reduction amount p (in this embodiment, the reduction amount p is equal to a sum of the input density value c0 specifying the threshold value b corresponding to a gap size and random number rd) corresponding to the threshold value b corresponding to the gap size from the original threshold value th1, is set to the corrected threshold value th6 (S40—NO, S44). Such a conversion processing can be represented by the following equation (5).

[Equation 5]

$$\left. \begin{array}{ll} th < c0 : th6 = th\max & (5-1) \\ th \geq c0 : th6 = th1 - (c0 + rd) & (5-2) \end{array} \right\} \quad (5)$$

According to the halftone-dot processing of the seventh embodiment, the gap size can be distributed in a desired range. Thereby, noise, which is added for preventing a pseudo outline from occurring, can be suppressed to the minimum necessary.

Having described the invention by way of exemplary embodiments, it should be understood that the technical scope of the invention is not limited thereto, but various changes and modifications thereof can be made without departing from the spirit of the invention. Also, it should be understood that the invention covers such a modification or improvement.

Further, the above embodiments are not intended to restrict the invention set forth in the claims. Furthermore, all combinations of characteristics described in the above embodiments are not requisite for the solving means of the invention. The above embodiments include various steps of the invention, and thus, various inventions may be made by appropriate combinations of a plurality of described elements. In addition, even if a few elements are removed from the overall elements of the above embodiments, a configuration from which the removed few elements are excluded may be established as the invention as long as an effect of the invention can be obtained.

For example, in the above second to seventh embodiments, a structure in which the gap dots are formed inside the generated halftone dots, that is, a structure, in which an output density error caused by forming output dots, is corrected supposing that the halftone dots and the gap dots are generated in synchronization with each other, has been described. However, with respect to the structure in which the output density error is corrected, the halftone dots and the gap dots may be asynchronously generated. In the case in which the halftone dots and the gap dots may be asynchronously generated, a control for compensating for gap dots is complicated. In this respect, it is effective that the halftone dots and the gap dots are generated in synchronization with each other.

<Configuration Using Computer>

Further, the above-described halftone dot process structure may be configured not only by a hardware processing circuit but also by software run by a computer on the basis of program codes for implementing a function.

Accordingly, it is possible to consider, as a part of the invention, a program or a computer-readable recording medium in which the program is stored to implement the image processing method, the image processing apparatus, or the image forming apparatus according to the invention, by means of software run by the computer. By employing a structure performed by the software, there is an advantage in that a process order and the like can be easily modified without modifying the hardware.

When the computer executes a series of halftone dot processes by using software, programs constituting the software are installed from a recording medium into a computer (for example, built-in microcomputer) built in a dedicated hardware, or a SOC (System On Chip) for implementing a desired system by mounting various functions such as a CPU (Central Processing Unit), logic circuits, memories and the like on a single chip, or a general-purpose personal computer which is capable of performing various functions by installing various programs into the computer, and the like.

The recording medium changes the state of energy, such as magnetism, light, electricity and the like, according to description contents of the program by using a reading unit included in a hardware resource of the computer, and delivers the description contents of the program to the reading unit according to a format of the signal corresponding to the change of the state of energy.

For example, the recording medium may include a magnetic disk (including a flexible disc (FD)) having a program recorded thereon, an optical disc (CD-ROM (Compact Disc-Read Only Memory)), a DVD (Digital Versatile Disc), an optical magnetic disc (including a MD (Mini Disc)), or a transportable package media composed of semiconductor memories and the like, all of which are distributed to users to provide a program separately from a computer, or a ROM or a hard disc having a program recorded thereon, which is provided to users in a condition in which it is installed beforehand in a computer. Also, the program constituting the software may be provided to users through a wired or wireless communication network.

For example, when a recording medium, which stores program codes of software for implementing the halftone processing function, is provided to a system or an apparatus and then a computer (or CPU or MPU) of the system or apparatus reads out and executes the program codes stored in the recording medium, it is possible to achieve the same effect as that obtained by a hardware processing circuit. In this case, the program codes themselves read out from the recording medium implements the halftone process functions.

Furthermore, not only the halftone process functions can be implemented when the computer executes the read program codes, but also, the halftone process functions can be implemented when OS (Operating System) running on the computer performs some or all of the actual processes on the basis of instructions of the program codes.

In addition, after the program codes read from the recording medium are written onto a memory installed in a function extension card inserted into a computer or a function extension unit connected to a computer, the halftone process functions can be implemented when a CPU or the like installed in the function extension card or the function extension unit performs some or all of the actual processes on the basis of instructions of the program codes.

Moreover, the program may be provided as a file in which the program codes for implementing the halftone process functions are described. In this case, the program may be provided as individual program modules according to the hardware configuration of a system constituted by the computer without being limiting to being provided as a collective program file.

What is claimed is:

1. An image processing method for generating a halftone image by forming a halftone dot represented by a set of one or plural output dots corresponding to an intensity of an input image signal while making a part of the dots constituting the halftone dot to be an actual non-output dot so as to reduce an amount of a coloring material of a halftone-dot portion, the image processing method comprising:

holding (1) halftone-dot profile data representing a threshold-value set for forming the halftone dot corresponding to the intensity of the image signal and (2) gap-size profile data representing a gap size, which is a size of a set of one or plural non-output dots representing the actual non-output dot;

correcting threshold values, which are other than a threshold value corresponding to the intensity of the image signal to be processed and are in the halftone-dot profile data, by referring to the gap size of the gap-size profile data, the gap size corresponding non-linearly to the intensity of the image signal to be processed;

comparing the corrected threshold values and the intensity of the image signal to be processed; and supplementing the halftone dot with the output dots to an outside of the halftone dot on the basis of the number of the non-output dots so as to compensate the gap represented by the non-output dots.

2. The image processing method according to claim 1, further comprising forming a halftone dot pattern to arrange the halftone-dot profile data with the gap-size profile data to generate the halftone dot.

3. The image processing method according to claim 1, wherein:
the gap size increases from a first intensity of the image signal to a transition point intensity higher than the first intensity, and
the gap size decreases from the transition point intensity to a second intensity of the image signal higher than the transition point intensity.

4. The image processing method according to claim 3, wherein the gap size reaches a maximum at the transition point intensity.

5. An image processing apparatus for generating a halftone image by forming a halftone dot represented by a set of one or plural output dots corresponding to an intensity of an input image signal while making a part of the dots constituting the halftone dot to be an actual non-output dot so as to reduce an amount of a coloring material of a halftone-dot portion, the image processing apparatus comprising:
a calculating section that generates binarized data, which can generate the halftone dot comprising a gap represented by the non-output dots, the number of the non-output dots corresponding to the intensity of the input image signal, the halftone dot represented by the output dots, the number of the output dots corresponding to the intensity of the input image signal;
a profile data storage section that holds (1) halftone-dot profile data representing a threshold-value set for forming the halftone dot corresponding to the intensity of the image signal and (2) nap-size profile data representing a gap size, which is a size of a set of the non-output dots; and
a gap-dot correcting section that supplements the halftone dot with the output dots to an outside of the halftone dot on the basis of the number of the non-output dots so as to compensate the gap generated by the calculating section, wherein:
the gap-dot correcting section comprises a threshold-value correcting section that corrects threshold values, which are other than a threshold value corresponding to the intensity of the image signal to be processed and are in the halftone-dot profile data held by the profile data storage section, by referring to the gap size of the gap-size profile data, the gap size corresponding non-linearly to the intensity of the image signal to be processed, and
the calculating section compares the threshold values corrected by the threshold-value correcting section and the intensity of the image signal to be processed.

6. The image processing apparatus according to claim 5, wherein the gap-dot correcting section supplements the output dots with a number of dots equal to the number of the non-output dots constituting the generated gap.

7. The image processing apparatus according to claim 5, wherein the calculating section generates the binarized data so long as the intensity of the image signal is in a range from a predetermined value on a low intensity side to a predetermined value on a high intensity side.

8. The image processing apparatus according to claim 5, wherein the gap-dot correcting section calculates an integrated value of intensity errors of output images caused by formation of the gap, and controls the formation of the gap so that this calculation result is within a predetermined value.

9. The image processing apparatus according to claim 5, wherein:
a random number is generated by a random-number generating apparatus, and the gap size is converted with using the random number.

10. The image processing apparatus according to claim 5, further comprising a halftone dot pattern forming section that forms a halftone dot pattern using the profile data storage section to arrange the halftone-dot profile data with the gap-size profile data to generate the halftone dot.

11. The image processing apparatus according to claim 5, wherein:
the gap size increases from a first intensity of the image signal to a transition point intensity higher than the first intensity, and
the gap size decreases from the transition point intensity to a second intensity of the image signal higher than the transition point intensity.

12. The image processing apparatus according to claim 11, wherein the gap size reaches a maximum at the transition point intensity.

13. An image forming apparatus for generating a halftone image by forming a halftone dot represented by a set of one or plural output dots corresponding to an intensity of an input image signal while making a part of the dots constituting the halftone dot to be an actual non-output dot so as to reduce an amount of a coloring material of a halftone-dot portion, the image forming apparatus comprising:
a calculating section that generates binarized data, which can generate the halftone dot comprising a gap represented by the non-output dots, the number of the non-output dots corresponding to the intensity of the input image signal, the halftone dot represented by the output dots, the number of the output dots corresponding to the intensity of the input image signal;
a profile data storage section that holds (1) halftone-dot profile data representing a threshold-value set for forming the halftone dot corresponding to the intensity of the image signal and (2) gap-size profile data representing a gap size, which is a size of a set of the non-output dots;
a gap-dot correcting section that supplements the halftone dot with the output dots to an outside of the halftone dot on the basis of the number of the non-output dots so as to compensate the gap generated by the calculating section; and
an image recording section that forms the halftone image having the actual non-output dot in the halftone dot, based on the binarized data, which the gap-dot correcting section supplements with the gap, wherein:
the gap-dot correcting section comprises a threshold-value correcting section that corrects threshold values, which are other than a threshold value corresponding to the intensity of the image signal to be processed and are in the halftone-dot profile data held by the profile data storage section, by referring to the gap size of the gap-size profile data, the gap size corresponding non-linearly to the intensity of the image signal to be processed, and
the calculating section compares the threshold values corrected by the threshold-value correcting section and the intensity of the image signal to be processed.

14. The image forming apparatus according to claim 13, further comprising a halftone dot pattern forming section that forms a halftone dot pattern using the profile data storage section to arrange the halftone-dot profile data with the gap-size profile data to generate the halftone dot.

15. The image forming apparatus according to claim 13, wherein:
the gap size increases from a first intensity of the image signal to a transition point intensity higher than the first intensity, and the gap size decreases from the transition point intensity to a second intensity of the image signal higher than the transition point intensity.

16. The image forming apparatus according to claim 15, wherein the gap size reaches a maximum at the transition point intensity.

* * * * *